United States Patent [19]
Kasai et al.

[11] Patent Number: 5,566,037
[45] Date of Patent: Oct. 15, 1996

[54] CASSETTE TAPE PLAYER COMPATIBLE WITH CASSETTE TAPES OF DIFFERENT FORMATS

[75] Inventors: Fumio Kasai; Kyozo Okumura; Takahiko Suezawa; Hideo Yoshida, all of Higashihiroshima, Japan

[73] Assignee: Sharp Kabushiki Kaisha, Japan

[21] Appl. No.: 393,039

[22] Filed: Feb. 23, 1995

Related U.S. Application Data

[63] Continuation of Ser. No. 7,708, Jan. 22, 1993, abandoned.

[30] Foreign Application Priority Data

Feb. 28, 1992 [JP] Japan ..................... 4-043660

[51] Int. Cl.⁶ ..................... G11B 5/008; G11B 15/68
[52] U.S. Cl. ............................................. 360/94
[58] Field of Search ................ 360/92, 94; 369/75.1, 369/36

[56] References Cited

U.S. PATENT DOCUMENTS

| | | | |
|---|---|---|---|
| 4,008,490 | 2/1977 | Lemelson | 360/94 |
| 4,866,550 | 9/1989 | Ohashi et al. | 360/94 |
| 5,016,127 | 5/1991 | Inoue et al. | 360/94 |

FOREIGN PATENT DOCUMENTS

| | | |
|---|---|---|
| 0406943 | 1/1991 | European Pat. Off. . |
| 0434143 | 6/1991 | European Pat. Off. . |
| 0444623 | 9/1991 | European Pat. Off. . |
| 61-178537 | 4/1960 | Japan . |
| 62-48039 | 9/1960 | Japan . |
| 61-79855 | 5/1986 | Japan . |
| 2174532 | 11/1986 | United Kingdom . |

*Primary Examiner*—Stuart S. Levy
*Assistant Examiner*—George J. Letscher
*Attorney, Agent, or Firm*—Nixon & Vanderhye

[57] ABSTRACT

A cassette tape player compatible with cassette tapes of different formats incorporates a cassette holder which holds an analog compact cassette and a digital compact cassette in a state they are placed one upon another. The cassette holder includes a cassette holder main body having an analog cassette storage section, a digital cassette storage section, and a second cassette holder member. The second cassette holder member is supported by the cassette holder main body such that it is slightly movable in a moving direction of the cassette holder, and has a slider moving lever for opening the slider of the digital cassette. A cassette tape player with such a cassette holder has separate magnetic heads for analog and digital signals, thereby lengthening the life of the magnetic heads and achieving faithful recording and reproduction.

29 Claims, 16 Drawing Sheets

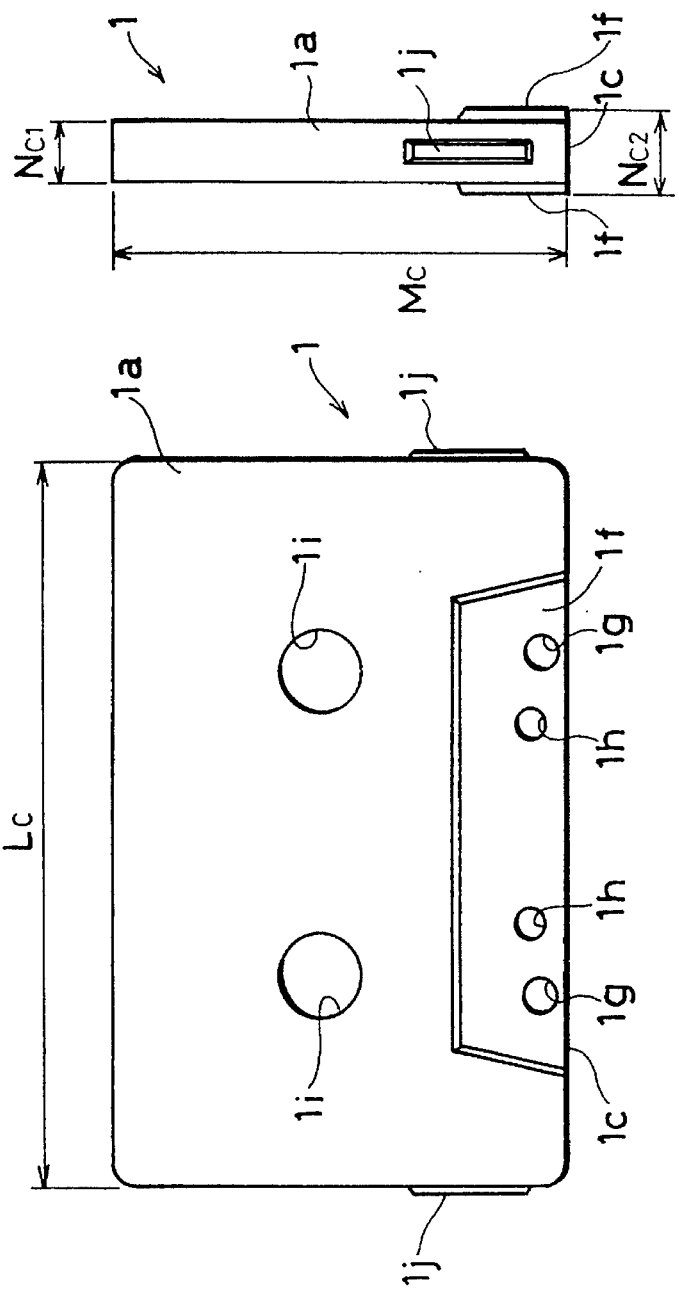

FIG. 12(a)
FIG. 12(d)
FIG. 12(b)
FIG. 12(c)
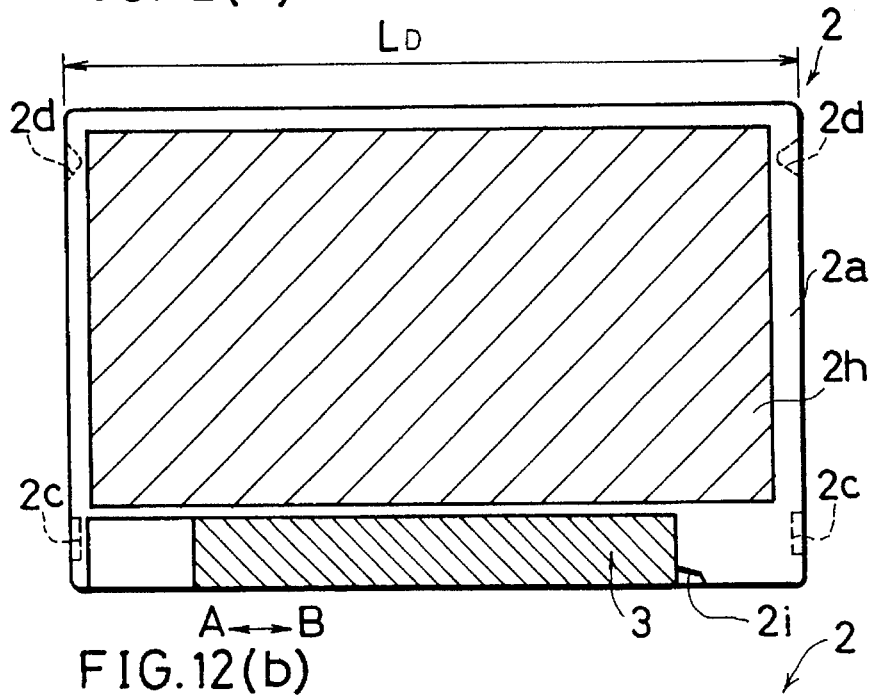
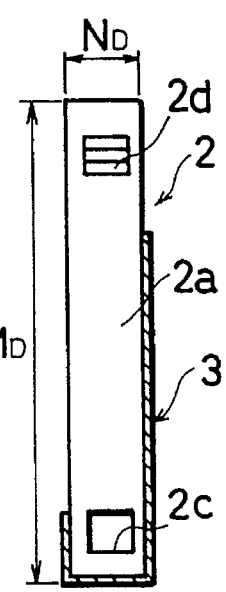
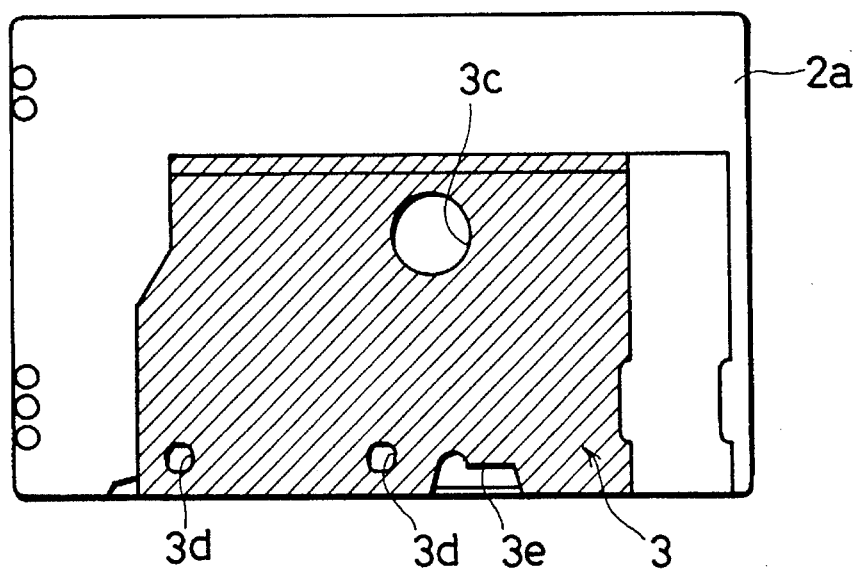
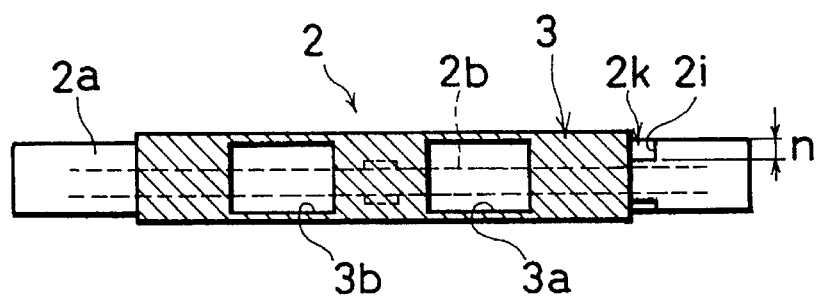

CASSETTE TAPE PLAYER COMPATIBLE WITH CASSETTE TAPES OF DIFFERENT FORMATS

This is a continuation of application Ser. No. 08/007,708 filed Jan. 22, 1993, now abandoned.

FIELD OF THE INVENTION

The present invention relates to a cassette tape player which is compatible with, for example, both analog and digital cassettes and has at least a recording or a reproduction function. For example, the analog cassette has an uncovered opening through which a head records and reproduces analog signals on a magnetic tape contained in the cassette. The digital cassette has dimensions substantially equal to those of the analog cassette, a magnetic tape on/from which a head records and reproduces digital signals, and a slider for covering an opening formed in the digital cassette. The slider is also provided with an opening and movable to expose the opening of the digital cassette.

BACKGROUND OF THE INVENTION

Cassette tape recorders which record and reproduce analog signals on an analog compact cassette [hereinafter referred to as C-cassette) shown in FIGS. 11(a), (b) and (c)] are widely used. However, in view of such factors as the internal structure, tape material and the analog recording and reproduction system of the C-cassette, further improvement in the quality of reproduced sound is not expected.

With such a background, in recent years, there have been proposals to develop a digital compact cassette (hereinafter referred to as D-cassette) which has dimensions almost equal to those of the C-cassette. The proposals concern a device that can not only record and reproduce digital signals on the D-cassette, but can also play conventional C-cassettes. In order to achieve recording and reproduction of digital signals, the material for the magnetic tape of D-cassette is restricted and various measures are taken to provide a smooth running of the magnetic tape. The D-cassette with a size substantially equal to that of the C-cassette enables digital recording and reproduction, thereby improving sound quality.

With particular reference to FIGS. 11(a)(b)(c) through 13(a)(b)(c), the following discussion contrasts the conventional C-cassette and the D-cassette.

The C-cassette 1 shown in FIGS. 11(a)(b)(c) has a cassette container 1a holding a magnetic tape 1b. Formed in the front edge of the C-cassette 1 is an opening 1d for allowing a head to record and reproduce information on the magnetic tape 1b. Formed on each side of the opening 1d is an opening 1e into which a pinch roller is to be inserted. As shown in the plan view, trapezoidal portions 1f of the front and back sides extending from one opening 1e to the other opening 1e are outwardly raised, respectively. Two capstan holes 1g and two positioning holes 1h are symmetrically formed to extend through both front and back sides of the C-cassette 1.

Formed symmetrically near the center of the cassette container 1a are two reel holes 1i extending through the front and back sides thereof. Two reels, not shown, around which the magnetic tape 1b is wound, are disposed in the cassette container 1a. The cassette container 1a has side projections 1j formed on the side edges in the vicinity of the front edge. The side projections 1j are provided so that the user easily holds the C-cassette when loading or unloading the C-cassette into/from the cassette tape recorder. Nowadays, however, this original effect of the side projections 1j is less significant.

As for a D-cassette 2 shown in FIGS. 12(a)(b)(c) and 13(a)(b)(c), like the C-cassette 1, a cassette container 2a holds magnetic tape 2b. Unlike the C-cassette 1, the D-cassette 2 has no raised portions 1f and projections 1j, but has side recessions 2c at positions corresponding to the side projections 1j and has side recessions 2d formed in each side edge in the vicinity of the rear edge. The back side of the cassette container 2a has hollow sections 2e formed at positions corresponding to the reel holes 1i of the cassettes container 1a. The hollow sections 2e do not extend to the front side of the cassettes container 2a, and therefore the front side has no holes. The front edge of the cassette container 2a has an opening 2f for allowing a head to engage with the magnetic tape 2b to perform a recording or reproducing operation, and openings 2g, formed on each side of the opening 2f, for pinch rollers. A label 2h is pasted on the front side of the cassette container 2a. Formed above the right opening 2g is a guide recession 2k for guiding the movement of a slider 3 to be described later. Looking at the D-cassette from the front, the guide recession 2k is substantially triangular in shape and has a slanting guide surface 2i and a contact surface 2j. Formed in the back side of the cassette container 2a are two capstan holes 2m and two positioning holes 2n which are arranged symmetrically in the vicinity of the front edge.

The biggest difference between the cassettes 1 and 2 is that the D-cassette 2 has the slider 3. Namely, whilst the opening 1d and the openings 1e of the C-cassette 1 are always uncovered, the opening 2f and the openings 2g of the D-cassette 2 are covered with the slider 3 when the D-cassette 2 is not used.

The slider 3 is made of a thin metal plate which has two right-angled corners in profile, and covers partially the front edge, and front and back sides of the cassette container 2a. The slider 3 is freely moved in the A-B direction and always pushed toward the B direction by a spring, not shown.

The front edge of the slider 3 has an opening 3a and an opening 3b corresponding to the opening 2f and the left opening 2g of the D-cassette 2, respectively. Looking at the D-cassette 2 from the back, the back side of the slider 3 has a reel hole 3c corresponding to the left hollow section 2e, positioning holes 3d corresponding to the positioning holes 2n, and a capstan hole 3e corresponding to the left capstan hole 2m.

When the slider 3 is moved in the B direction, as shown in FIG. 12(c), the opening 2f and the openings 2g are covered with the slider 3 and the magnetic tape 2b in the cassette container 2a is protected. At this time, the guide recession 2k except the right slanting guide surface 2i is covered with the slider 3.

As illustrated in FIG. 13(c), when the slider 3 is moved in the A direction, the opening 3a and the opening 3b of the slider 3 are aligned with the opening 2f and left opening 2g, respectively, and uncover the openings 2f and 2g. The movement of the slider 3 in the A direction is driven by a slider moving mechanism. Specifically, when the slider moving mechanism is inserted into the guide recession 2k, it comes into contact with the slider 3 and moves in the A direction, thereby moving the slider 3 in the A direction.

The side recessions 2d of the cassette container 2a are called changer grips in general and allow the D-cassette 2 to be compatible with a cassette tape recorder having a changer function. The cassette tape recorder with the changer function has a cassette storage section capable of storing a plurality of D-cassettes 2, and records and reproduces information on/from a cassette selected from the D-cassettes 2 in the cassette storage section. The side recessions 2d are used as holes for holding the selected D-cassette 2 when moving it from the cassette storage section to the record/reproduction position. Meanwhile, the side recessions 2c are generally called storage grip and used as holes holding the D-cassette 2 when carrying it to the record/reproduction position for recording and reproduction.

The following description explains the dimensions of the C-cassette 1 and of the D-cassette 2. The C-cassette 1 has a length $L_c$ of 100.4 mm, a width $M_c$ of 63.8 mm, a thickness $N_{C^1}$ (without including raised portions 1f) of 8.6 mm (tolerance: +0.3 mm, −0.1 mm), and a thickness $N_C$ (including raised portions 1f) of 12.0 mm (tolerance: +0.3 mm, −0.1 mm). The length $L_c$ (100.4 mm) of the C-cassette 1 is the length of the cassette main body and does not include the side projections 1j. Therefore the overall length of the C-cassette 1 is slightly greater than 100.4 mm.

According to the specification of the D-cassette 2, the length and the width of the D-cassette 2 are the same as the C-cassette 1, namely it has a length $L_D$ of 100.4 mm and a width $M_D$ of 63.8 mm. The D-cassette 2 has a thickness $N_D$ of 9.6 mm which is thicker than the thickness $N_{C^1}$ and thinner than the thickness $N_{C^2}$ of the C-cassette 1. The depth n of the guide recession 2k of the D-cassette 2 is 2.5 mm.

Next, a cassette tape recorder which records and reproduces information on/from either the C-cassette 1 or D-cassette 2 is described below. Such a cassette tape recorder compatible with the C-cassette 1 and the D-cassette 2 performs both recording and reproduction in an automatic reverse mode with respect to the D-cassette 2 and at least plays the C-cassette 1 in the automatic reverse mode.

This cassette tape recorder has a cassette holder including just one cassette storage section capable of storing either the C-cassette 1 or the D-cassette 2. The cassette holder has a slider moving mechanism for opening and closing the slider 3 of the D-cassette 2. The cassette tape recorder has detecting means for detecting the type of a cassette stored in the cassette storage section. The detecting means enables the cassette storage section to store cassettes of different formats.

The cassette tape recorder has a rotary head mechanism 50 as shown in FIG. 14. As illustrated in FIG. 15, the rotary head mechanism 150 has a magnetic head 153 and head moving means 154 for moving the magnetic head 153. The magnetic head 153 is constituted by a digital head 151 (DH1 to DH9) and an analog head 152 (AH1 and AH2) aligned in a vertical direction on the same plane. The rotary head mechanism 150 rotates the magnetic head 153 by 180 degrees with the head moving means 154 to bring the respective heads 151 and 152 into the reversed state as shown in FIG. 16 so as to record or reproduce analog signals or digital signals in a suitable manner on/from a selected cassette (C-cassette or D-cassette).

The digital head 151 includes reproduction-use MR (magnetic resistance) heads and recording-use IH (inductive) head, while the analog head 152 includes only reproduction-use MR heads. Accordingly, the magnetic head 153 is capable of recording and reproducing information on/from the D-cassette 2 but incapable of recording information on the analog C-cassette 1. This is because overwriting is possible with respect to the D-cassette 2 but is not feasible with respect to the analog C-cassette 1. Therefore, an erase head is required to record information on the C-cassette 1. In other words, in order to record analog signals, an IH head and an erase head need to be disposed symmetrically on both sides of the MR head. Thus, this arrangement is not suitable for mass production since it requires five heads in total.

In order to enable the storage section to store cassettes of different formats, the cassette tape recorder needs to have a special device, for example, cassette detecting means, and a slider moving mechanism of a highly complicated structure. Consequently, the assembling process becomes complicated and the manufacturing costs increase substantially. Moreover, in the rotary mechanism 150, since the magnetic tape 1b or 2b of the cassette 1 or 2 is needed to be fed slidingly in contact with the magnetic head 153, the following problem arises.

Namely, a gap portion in the digital head 151 is much smaller than that in the analog head 152. The specification does not so strictly restrict the material of the magnetic tape 1b of the C-cassette 1 as it does with respect to the magnetic tape 2b of the D-cassette 2. Thus, when the magnetic tape 1b is fed past the magnetic head 153 while being made contact therewith, the magnetic powder of the magnetic tape 1b of the C-cassette 1 penetrates into the gaps in the digital head 151, causing the gaps to get clogged. As a result, the cassette tape recorder shows deterioration in the quality of the recording and reproduction with respect to the D-cassette 2.

To pursue an improvement in cost, the life of the magnetic head, and quality of recording and reproduction, it is beneficial to provide separate analog and digital heads for the C-cassette 1 and the D-cassette 2, respectively. In such a situation, the present applicant incorporated a cassette holder with two cassette storage sections, capable of storing two cassettes in a state where they are placed one upon another, into a cassette tape recorder compatible with C-cassette and D-cassette as disclosed in the Japanese Publication for Unexamined Utility Model Applications No. 178537/1986, No. 48039/1987, and No. 79855/1986.

Each of the cassette holders described in these publications stores two C-cassettes 1 placed one upon another. These cassette holders do not have a slider moving mechanism for opening and closing the slider 3 of the D-cassette 2 and therefore they are incompatible with the D-cassette 2. Moreover, it is difficult to incorporate a slider moving mechanism into these cassette holders due to the following reasons.

A cassette holder which has the slider moving mechanism and is capable of storing the C-cassette 1 and the D-cassette 2 one upon another needs to be movable between the load/unload position and the record/reproduction position. Recording and reproduction of information on the C-cassette 1 and the D-cassette 2 is available at the record/reproduction position. When the cassette holder is moved to the record/reproduction position, the C-cassette 1 and the D-cassette 2 are fixed in predetermined positions.

To hold the cassette 1 in a stationary state, the cassette holder disclosed in each of the above-mentioned publications has restricting means which restricts the level, i.e., the distance from the bottom of the holder storage section to the cassette 1 by supporting the back side of the cassettes 1 when the cassette holder comes into contact with the bottom of the holder storage section. Therefore, when the cassette holder is moved to the record/reproduction position, the location of the cassette 1 in the cassette storage section shifts in a direction opposite to the direction in which the cassette holder is moved because the restricting means support the cassette 1. Namely, the location of the cassette 1 relative to the cassette holder varies when the cassette holder is in the load/unload position and when it is in the record/reproduction position.

As for the D-cassette 2, since only the back side has the hollow sections 2e, it is stored in one cassette storage section more distant from the bottom of the holder storage section. Therefore, the slider moving mechanism is mounted on the top plate (i.e., a member constituting the cassette storage section, located farthest away from the bottom of the holder storage section) of the cassette holder.

When the cassette holder is in the load/unload position and the D-cassette 2 is loaded into the holder storage section, the slider moving member of the slider moving mechanism is inserted into the guide recession 2k. The inserted slider moving member comes into contact with the slider 3 and moves the slider 3.

However, when the above-mentioned restricting means is used as it is, the following problems arise. Namely, when the cassette holder having the D-cassette 2 in the holder storage section is moved to the record/reproduction position, the D-cassette 2 shifts to a direction opposite the direction in which the cassette is moved because it is supported by the restricting member. In other words, the D-cassette 2 is moved toward the top plate of the cassette holder whereupon the slider moving mechanism is mounted. Consequently, the positional relation between the slider moving member and the guide recession 2k changes.

Therefore, the edge of the slider moving member may crash into the bottom of the guide recession 2k due to the effects of the depth n (2.5 mm) of the guide recession 2k of the D-cassette 2, the amount of movement of the D-cassette 2, preciseness in the dimensions of the slider moving member, and inaccuracy of assembling. In other words, unless the preciseness in the dimensions of the restricting member and of parts of the slider moving mechanism are controlled very strictly, it is almost impossible to prevent the edge of the slider moving member from crashing into the bottom of the guide recession 2k. In reality, it is impossible to incorporate into the cassette holders of the above-mentioned publications a slider moving mechanism which properly opens the slider 3.

SUMMARY OF THE INVENTION

It is an object of the present invention to provide a cassette tape player which is capable of holding cassettes of different formats, such as the above-mentioned C-cassette and D-cassette placed one upon another, has a cassette holder capable of opening the slider of the D-cassette with certainty, reduces costs, lengthens the life of a magnetic head, and improves the quality of recording and reproduction.

In order to achieve the above-mentioned object, a cassette tape player of the present invention performs at least a recording or reproducing operation with respect to cassette tapes of different formats. Namely, a first cassette tape having an exposed opening for the head in its front edge; and a second cassette tape having an opening for the head in its front edge, a slider which covers the opening and is movable in a longitudinal direction of the front edge, and a guide recession formed at a portion of the front edge where the slider is attached. The cassette tape player includes:

a main body having a cassette holding means storage section for storing cassette holding means;

the cassette holding means which is movable in a direction in which it is moved to be stored in the cassette holding means storage section and in a direction in which it is moved to be taken out thereof, which holds the first cassette tape and the second cassette tape placed one upon another, and which includes a cassette holder main body having a first cassette storage section for storing the first cassette tape and a second cassette storage section for storing the second cassette tape, and a second cassette holder member which is supported by the cassette holder main body so that it is slightly movable in a moving direction of the cassette holding means;

first cassette fixing means for fixing the first cassette tape in a predetermined position in the first cassette storage section;

second cassette fixing means for fixing the second cassette tape in a predetermined position in the second cassette storage section;

holder fixing means for fixing the second cassette holder member in a predetermined position in the cassette holding means storage section;

slider moving means which is mounted on the second cassette holder member and designed to be inserted into the guide recession of the second cassette tape to move the slider in an opening direction by pushing;

first cassette positioning means which comes into contact with the first cassette tape stored in the first cassette storage section and moves the first cassette tape in the moving direction of the cassette holding means to place it in the predetermined position; and holder positioning means which comes into contact with the second cassette holder member and moves the second cassette holder member in the moving direction of the cassette holding means to place it in the predetermined position.

With this configuration, when the first cassette tape is stored in the first cassette storage section of the cassette holder main body, it is fixed in the predetermined position by the first cassette tape fixing means. When the cassette holding means is stored in the cassette holding means storage section, the first cassette tape is placed in a predetermined position in the cassette holding means storage section by the first cassette positioning means. Thus, the first cassette tape is locked in the predetermined position in the cassette holding means storage section.

Meanwhile, when the second cassette tape is stored in the second cassette storage section of the second cassette holder member, it is fixed in the predetermined position in the second cassette storage section by the second cassette tape fixing means. At this time, the slider of the second cassette tape is opened by the slider moving means mounted on the second cassette holder member.

Although the second cassette holder member is designed to be movable with respect to the cassette holder main body and to be moved in the moving direction of the cassette holding means, it is fixed in the predetermined position in the second cassette storage section by the holder fixing means. Then, when the cassette holding means is stored in the cassette holding means storage section, the second cassette holder member is positioned in a predetermined position in the cassette holding means storage section by the holder positioning means. This causes the second cassette tape fixed in the predetermined position in the second cassette storage section to be locked in the predetermined position in the cassette holding means storage section.

In this case, the second cassette tape is not displaced into the moving direction of the cassette holding means within the second cassette storage section. Namely, in states where the cassette holding means is stored in the cassette holding means storage section (i.e., when the cassette holding means is in the record/reproduction position) and where the cassette holding means is taken out of the cassette holding means storage section (i.e., when the cassette holding means is in the load/unload position), there is no change in the positional relation between the second cassette tape and the second cassette holder member. Consequently, the positional relation between the slider moving means of the second cassette holder member and the second cassette tape is unchanged. Therefore, the slider moving means is easily installed in the second cassette holder member, and the slider moving means installed in the second cassette holder member always opens the slider of the second cassette tape properly.

In short, the above-mentioned cassette tape player compatible with cassette tapes of different formats is capable of holding the first and second cassette tapes in a state where they are placed one upon another and has the cassette holding means with the slider moving means which properly opens the slider of the second cassette tape. Thus, differently from a cassette tape recorder having a cassette holder which stores cassettes of different formats in the same cassette storage section, there is no need to incorporate into the cassette tape player of the present invention an extra device, such as cassette detecting means, thereby resulting in a great reduction of the costs. Moreover, with this cassette tape player, since it is possible to install separate magnetic heads for analog signals and digital signals, the analog cassette tape does not have to be fed in a sliding manner past the head for digital signals. This arrangement enables the life of the magnetic heads to be significantly lengthened and the quality of the recording and reproduction to be improved.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 13 explains the present invention in detail.

FIG. 1 is a partial cross sectional front view illustrating a cassette holder of a cassette tape recorder compatible with C-cassettes and D-cassettes.

FIG. 2 is a partial cross sectional rear view illustrating the cassette holder.

FIG. 3 is a partial cross sectional side view illustrating the cassette holder.

FIG. 4 is a side view illustrating a grip mechanism of the cassette holder.

FIG. 5 is a plan view illustrating a slider moving lever of the cassette holder.

FIG. 6 is a front view illustrating a head mechanism of the cassette tape recorder.

FIG. 7 is a rear view illustrating head rotating means of the head mechanism.

FIG. 8 is a partial cross sectional side view illustrating the cassette holder located in the load/unload position.

FIG. 9 is a partial cross sectional side view illustrating the first cassette storage section of the cassette holder storing the C-cassette and the second cassette storage section of the cassette holder into which the D-cassette is being loaded.

FIG. 10 is a plan view illustrating the slider moving lever which is opening the slider of the D-cassette.

FIG. 11(a) is a plan view showing the C-cassette, FIG. 11(b) a front view showing the C-cassette, and FIG. 11(c) is a side view showing the C-cassette.

FIG. 12(a) is a plan view showing the D-cassette, FIG. 12(b) a bottom plan view showing the D-cassette, FIG. 12(c) a front view showing the D-cassette, and FIG. 12(d) is a side view showing the D-cassette.

FIG. 14 is a perspective view illustrating the rotary head mechanism.

FIG. 15 is a front view illustrating digital and analog heads in a magnetic head constituting the rotary head mechanism.

FIG. 16 is a front view illustrating the reversed digital and analog heads.

DESCRIPTION OF THE EMBODIMENT

Figure 13A:
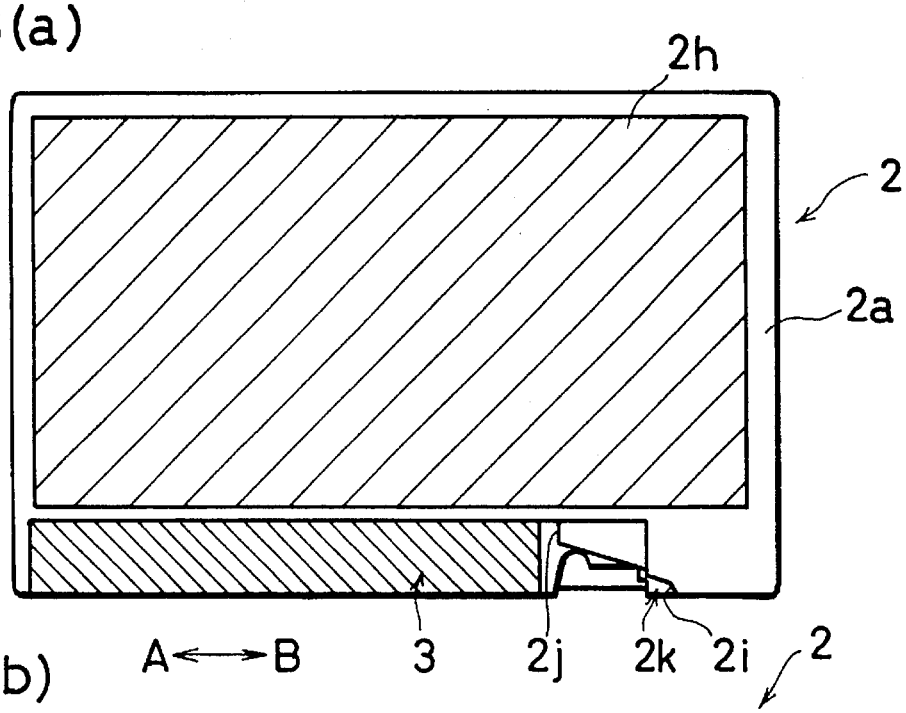
FIG. 13(a) is a plan view showing the D-cassette with its slider opened, FIG. 13(b) a bottom plan view showing the D-cassette with its slider opened.
Figure 13B:
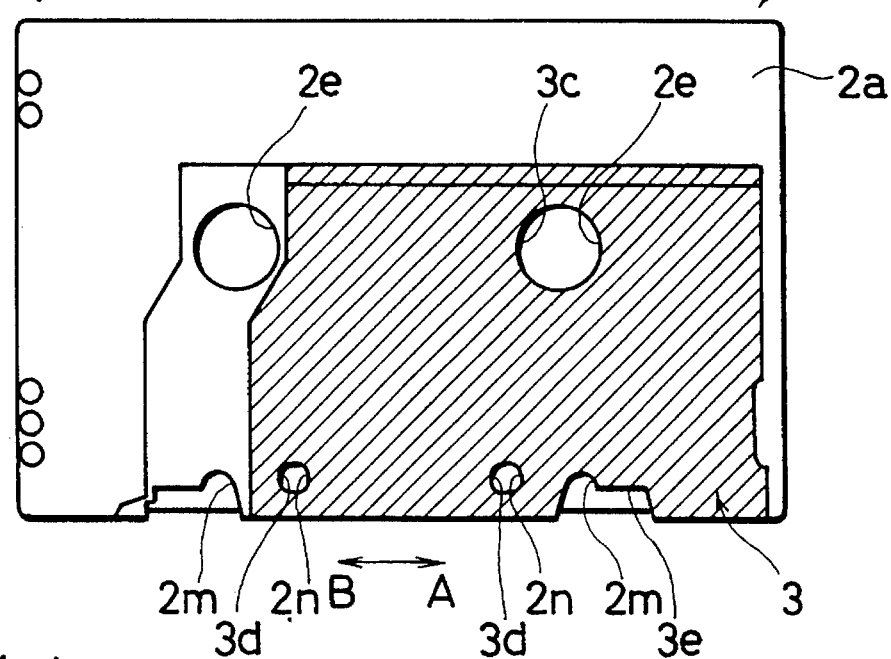
Figure 13C:
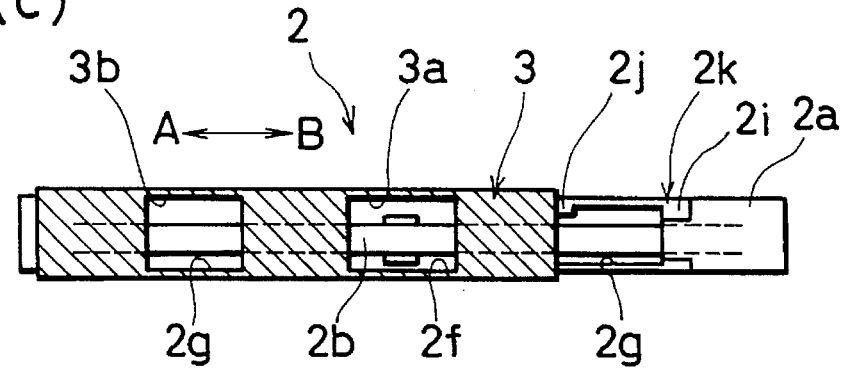
FIG. 13(c) is a front view showing the D-cassette with its slider opened.
Figure 14:
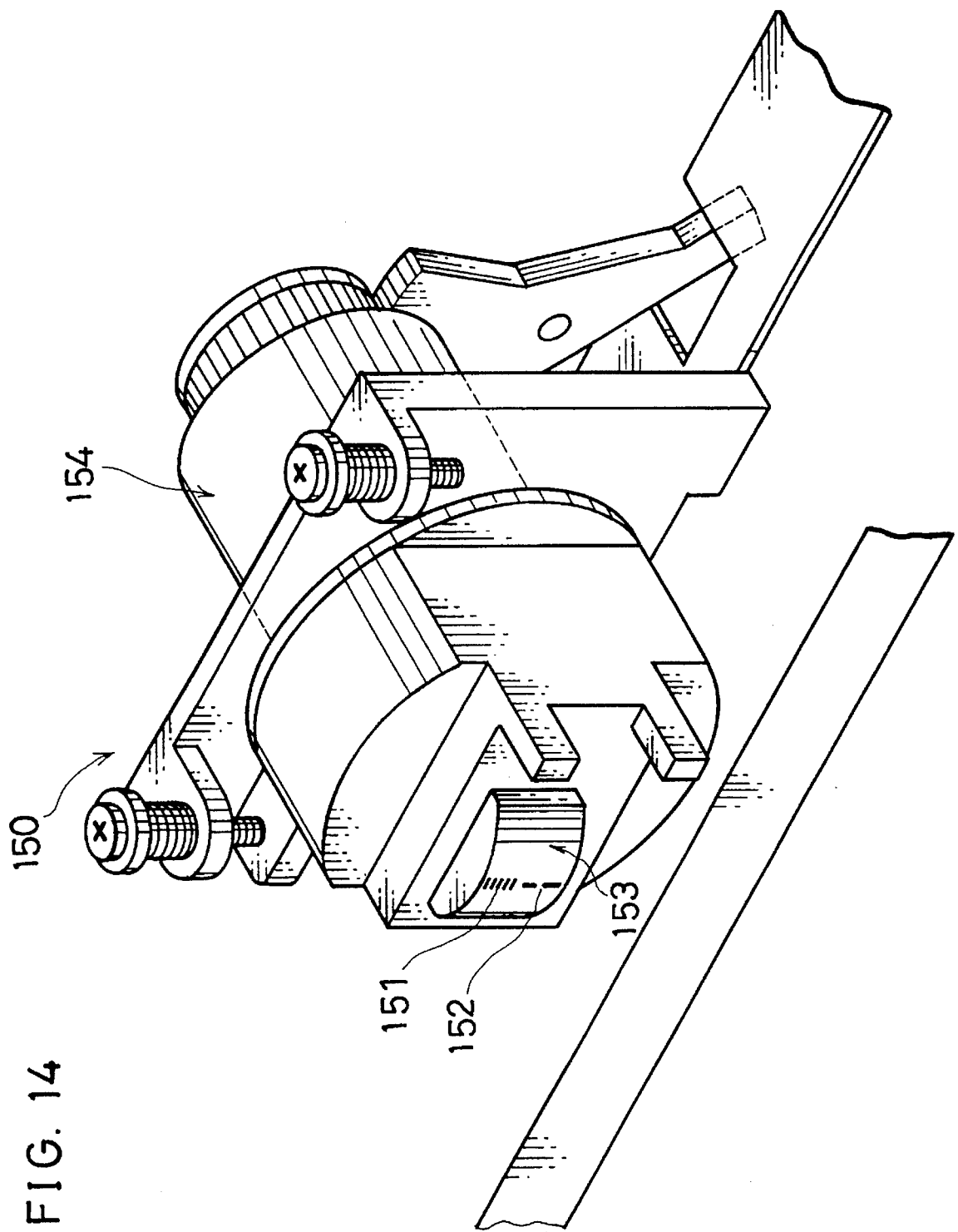
FIGS. 14 through 16 illustrate a rotary head mechanism employed by a conventional cassette tape player which stores cassette tapes of different formats in the same cassette storage section.
Figure 15:
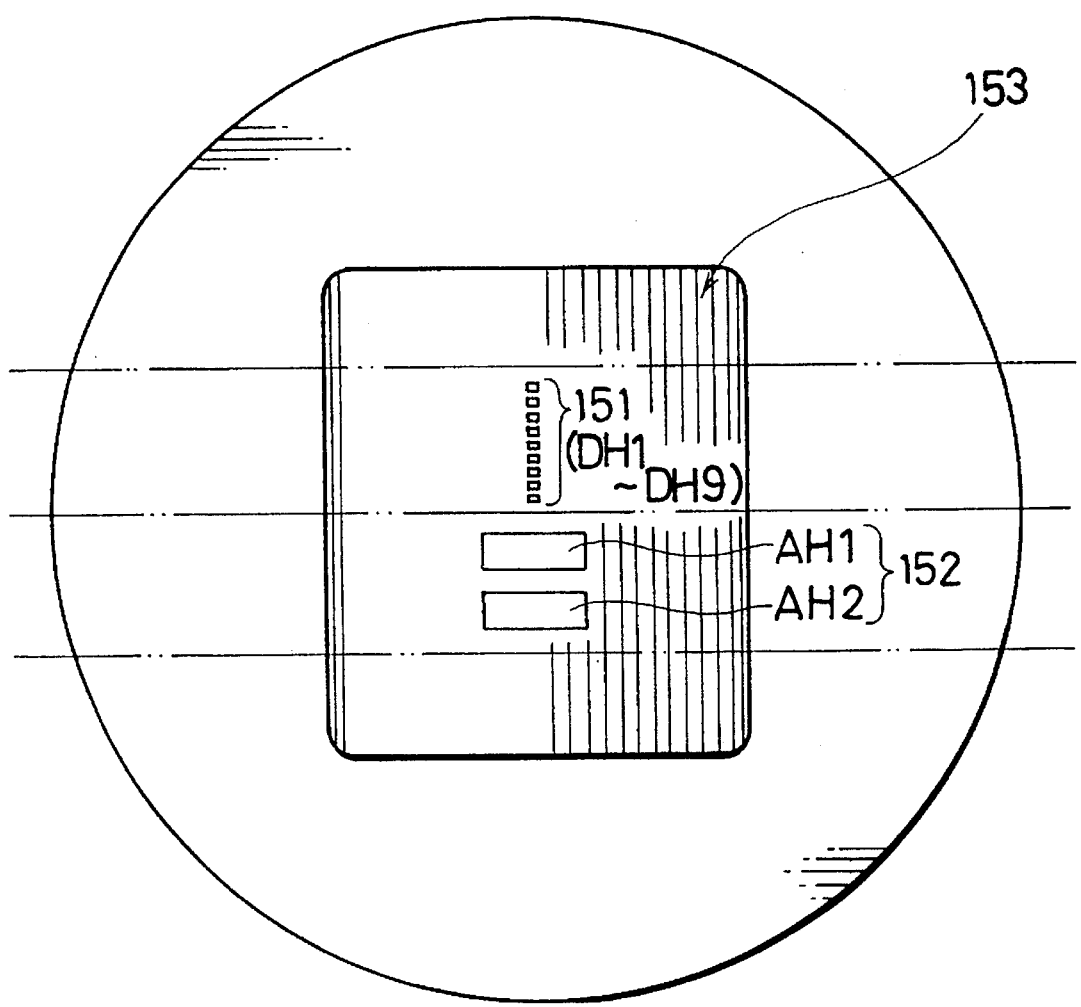
Figure 16:
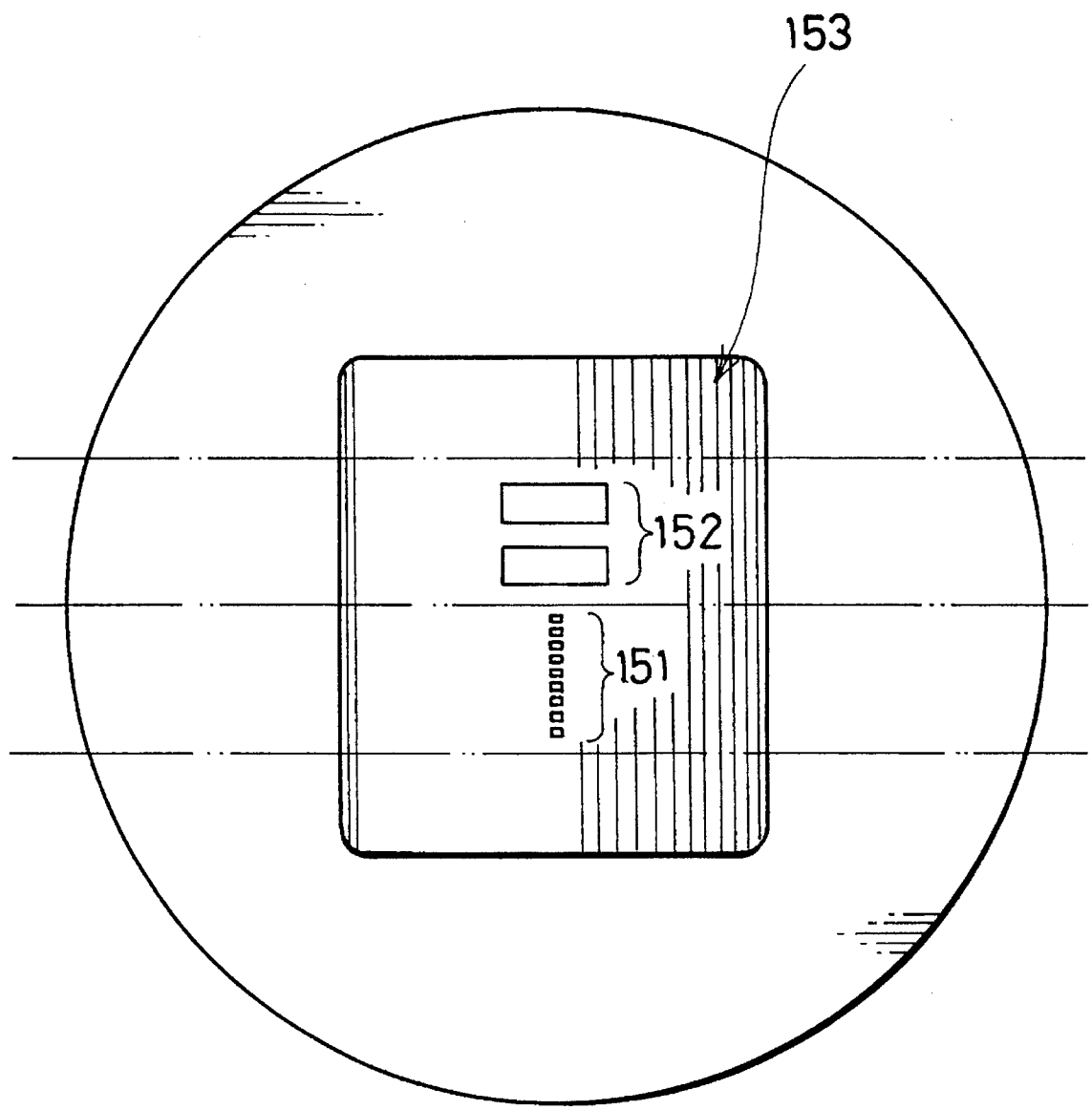

With reference to FIGS. 1 through 13, the following description discusses one embodiment of the present invention. In this embodiment, a cassette tape recorder, which is capable of recording and reproducing information on/from the above-mentioned C-cassette 1 and D-cassette 2 (see FIGS. 11 through 13), is taken as one example of a cassette tape player compatible with cassettes of different formats. Directions A through F shown by arrows in FIGS. 1 through 10 are corresponding to each other.

Figure 1:
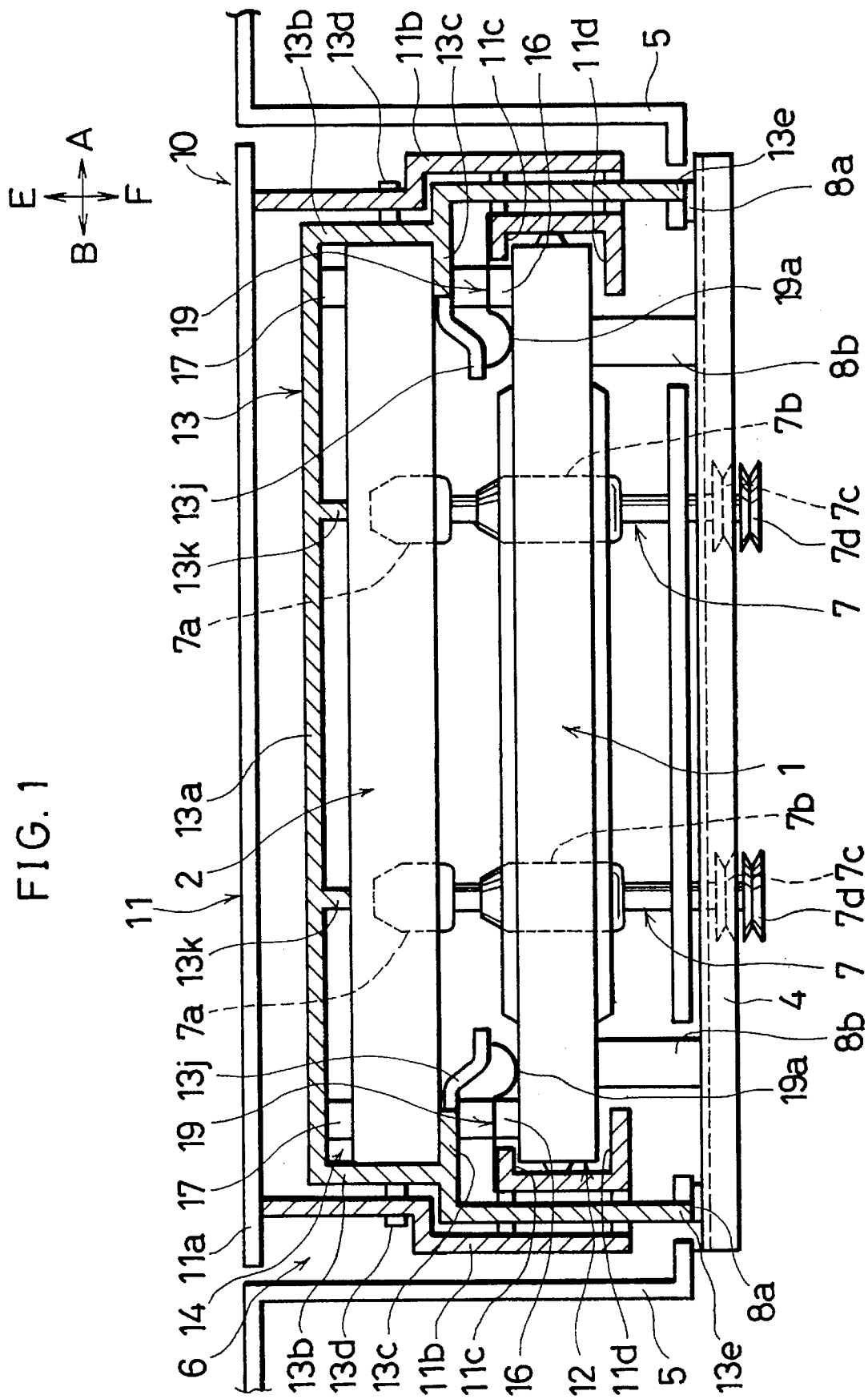
Figure 2:
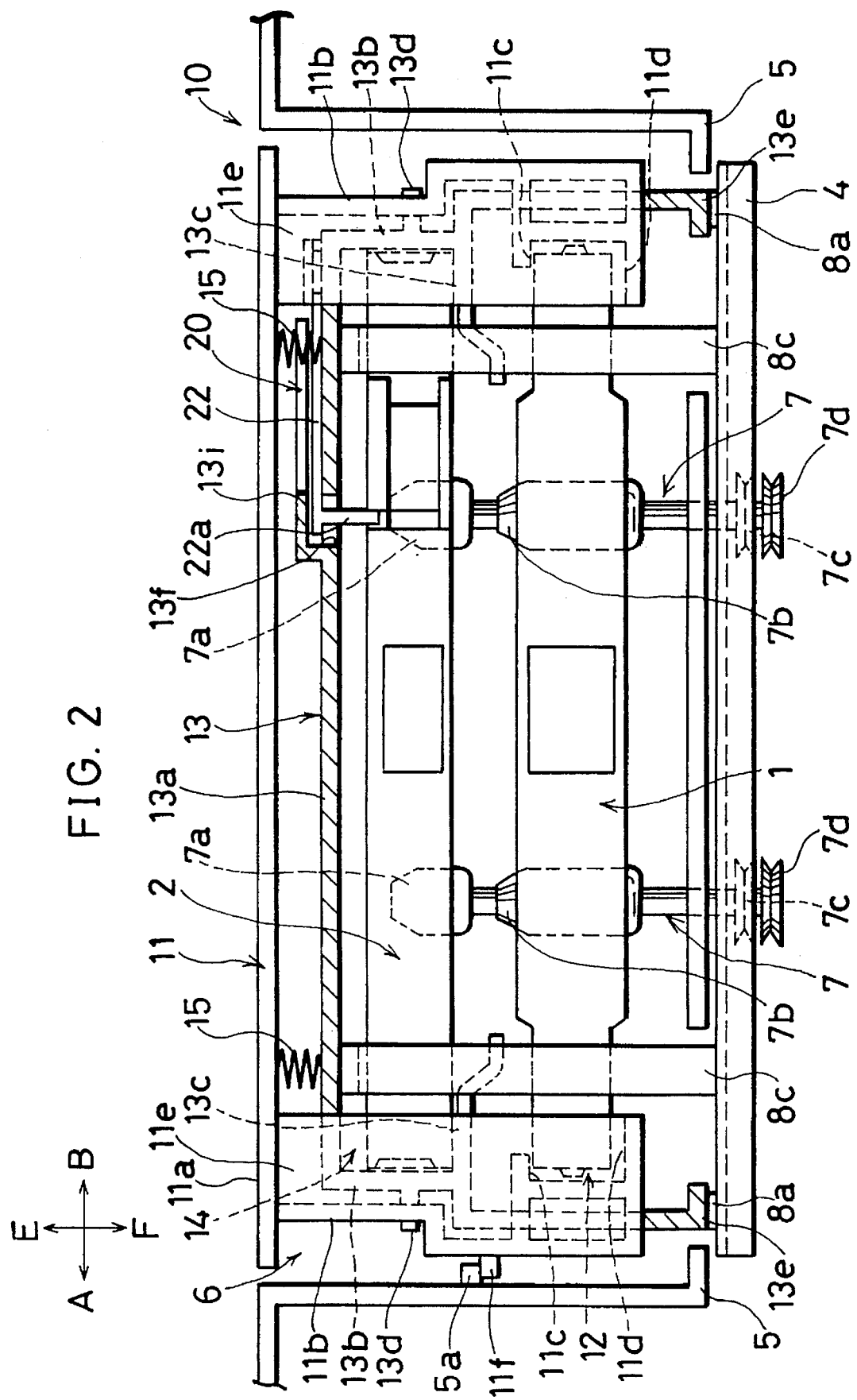
Figure 3:
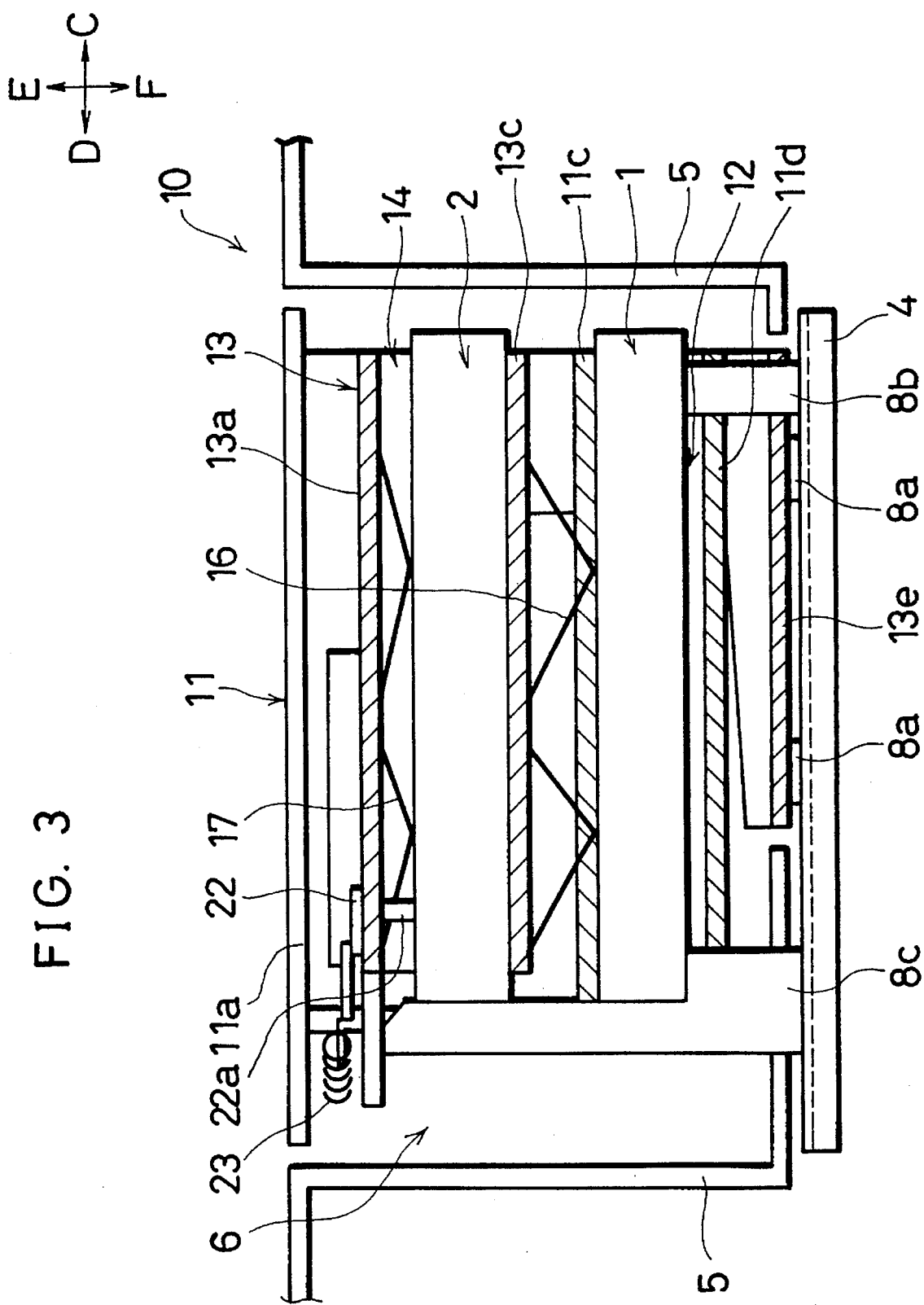

As illustrated in FIGS. 1 through 3, the cassette tape recorder of this embodiment has a cassette holder 10 (cassette holding means) which stores the C-cassette 1 (first cassette tape) and the D-cassette 2 (second cassette tape) placed one upon another. The cassette holder 10 is stored in a hollow holder storage section 6 (cassette holding means storage section) constituted by a main chassis 4 and a cabinet 5 of the main body. The cassette holder 10 is moved in the E-F direction between a load/unload position and a record/reproduction position by a holder moving mechanism, not shown. In the load/unload position, the cassette holder 10 comes out of the holder storage section 6 so as to load or unload the cassettes 1 and 2. In the record/reproduction position, the cassette holder 10 is stored in the holder storage section 6 and a head mechanism, to be described later, records or reproduces information on the cassettes 1 and 2. The holder moving mechanism has pushing means (not shown), for example, a spring, and always pushes the cassette holder 10 toward the load/unload position, i.e., in the E direction.

A pair of reel shafts 7 are symmetrically mounted on the main chassis 4 so that the reel shafts 7 pass through reel holes 1i and 2e of the C-cassette 1 and the D-cassette 2, respectively. A reel hub 7a for the D-cassette 2 is attached to the upper end of each reel shaft 7, while a reel hub 7b for the C-cassette 1 is rotatably attached to a central portion of each reel shaft 7. The reel hubs 7a and the reel hubs 7b are rotatable individually. Each reel shaft 7 has two pulleys 7c and 7d mounted integrally one upon another on the underside of the main chassis 4. When the pulleys 7c and 7d are driven by a drive motor via a connecting belt, not shown, the reel hubs 7a and 7b rotate to wind the magnetic tapes 1b and 2b of the C-cassette 1 and the D-cassette 2 in a forward direction or the reverse direction.

Mounted upon the main chassis 4 are supporting bosses 8a (holder positioning means, and holder movement restricting member), supporting bosses 8b (first cassette positioning means, and first cassette movement restricting means), and supporting bosses 8c (holder positioning means, holder movement restricting member, first cassette positioning means, and first cassette movement restricting member). The supporting bosses 8a support a second cassette holder member 13, to be described later on, and restricts the level of the second cassette holder member 13 in the holder storage section 6. The supporting bosses 8b support the C-cassette 1 and restrict the level of the C-cassette 1 in the holder storage section 6. The supporting bosses 8c support the second cassette holder member 13 and the C-cassette 1 simultaneously in the holder storage section 6. The tolerance for the height of the supporting bosses 8a, 8b and 8c are very strictly restricted since the objectives of the supporting bosses 8a, 8b, and 8c are to restrict the level of the second cassette holder member 13 and/or of the C-cassette 1 in the holder storage section 6.

The level of the second cassette holder member 13 and of the C-cassette 1 means their positions in the moving direction of the cassette holder 10 in the holder storage section 6.

The cabinet 5 has a lock lever 5a to be connected to a projection 11f of the main body 11 of the cassette holder 10. The lock lever 5a is always pushed in the C direction by pushing means, for example, a spring, not shown, and interlocks with an eject button and interlocking means so that it is movable in the D direction. With this arrangement, when the user stores the cassette holder 10 in the holder storage section 6, the lock lever 5a is connected to the projection 11f, causing the cassette holder 10 to be held in a predetermined position, i.e., the record/reproduction position in the holder storage section 6. Meanwhile, when the user presses the eject button, the lock lever 5a is disconnected from the projection 11f, and the cassette holder 10 is moved to the load/unload position by the pushing means of the holder moving mechanism. After the user over-strokes the cassette holder 10 to a stopper position, not shown, the pushing means pushes and moves the cassette holder 10 to lock the projection 11f and the lock lever 5a which has been moved in the C direction by the lever pushing means.

The cassette holder 10 is constituted by a main body 11 having the first cassette storage section 12 for storing the C-cassette 1, and the second cassette holder member 13 having the second cassette storage section 14 for storing the D-cassette 2. The second cassette holder member 13 is supported by the main body 11 so that it is movable slightly in the moving direction (E-F direction) of the cassette holder 10.

The main body 11 has a cover 11a (covering member) for covering the holder storage section 6 when the cassette holder 10 is in the record/reproduction position and side walls 11b which are attached perpendicularly to the underside of the cover 11a near the right and left ends thereof. Formed at a lower portion of the inner surface of each side wall 11b are opposing protruding parts 11c and 11d (first cassette storage section forming members) which are bent at right angles in the same direction to form the first cassette storage section 12. Attached to the rear edge of each side wall 11b is a rear wall 11e for supporting the cassettes 1 and 2 when they are stored in the first and second cassette storage sections 12 and 14. The outer surface of the side wall 11b which faces the lock lever 5a when the cassette holder 10 is in the record/reproduction position has the projection 11f. As described above, the projection 11f enables the main body 11 to be positioned and fixed in the record/reproduction position.

The second cassette holder member 13 has a shape like the main body 11 but it is smaller than the main body 11. The second cassette holder member 13 has a cover 13a (first plate member), and side walls 13b which are attached perpendicularly to the right and left ends of the underside of the cover 13a. Formed at an upper portion of the inner surface of each side wall 13b is a protruding part 13c (second cassette storage section forming members) for forming the second cassette storage section 14. The outer surface of each side wall 13b has a supporting projection 13d. The supporting projections 13d penetrate through the guide slots, not shown, formed in the side walls 11b, respectively. This arrangement allows the second cassette holder member 13 to be moved slightly in the E-F direction while being guided by the guide slots when changing its position with respect to the main body 11.

Formed between the cover 13a of the second cassette holder member 13 and the cover 11a of the main body 11 are springs 15 (holder fixing means, holder pushing means, also known as the cassette biasing member(s)). These springs 15 cause the second cassette holder member 13 to be always pushed in the F direction in the main body 11. Also formed at the bottom of the side walls 13b are contact sections 13e which come into contact with the supporting bosses 8a in the record/reproduction position. When the cassette holder 10 is stored in the holder storage section 6 and when the second cassette holder member 13 is pushed in the F direction by the springs 15, the contact sections 13e come into contact with the supporting bosses 8a. Consequently, the second cassette holder member 13 in the holder storage section 6 is positioned and fixed on a predetermined level. The second cassette holder member 13 is installed in the main body 11 by bending the cover 13a.

A spring 16 (first cassette tape fixing means, first cassette pushing means) which is a flat spring having a substantially W-shaped profile is attached to each protruding part 13c of the second cassette holder member 13 by, for example, high frequency welding. Springs 17 (second cassette tape fixing means and second cassette pushing means, also known as the cassette biasing member(s)) which are flat springs having a substantially W-shaped profile are attached to the cover 13a by, for example, high frequency welding. The springs 16 and 17 push in the F direction the cassettes 1 and 2 stored in the first and second cassette storage sections 12 and 14 to fix their positions in the first and second cassette storage sections 12 and 14. Namely, since the first and second cassette storage sections 12 and 14 are positioned and fixed on predetermined levels in the holder storage section 6, the cassettes 1 and 2 stored in these cassette storage sections 12 and 14 are fixed in position in the holder storage section 6.

Figure 4:
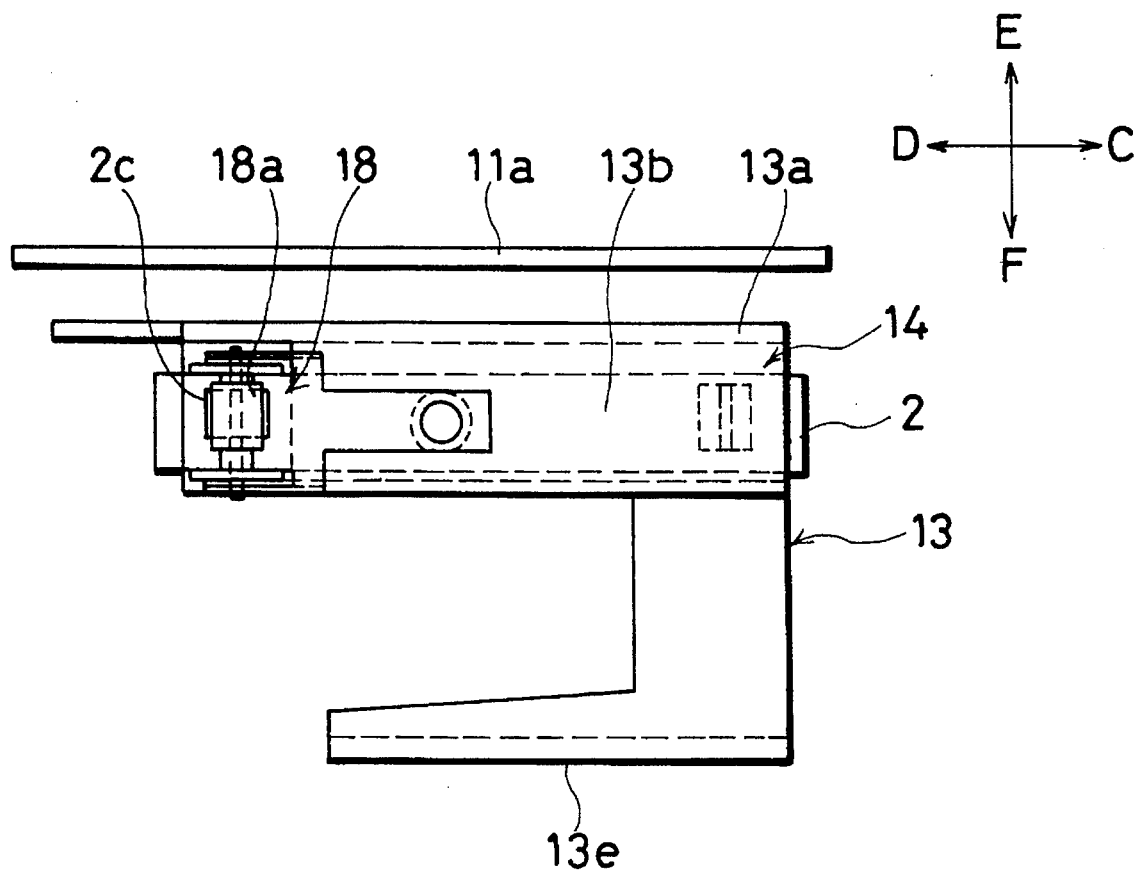

The front edge of each side wall 13b has a grip mechanism 18 as shown in FIG. 4. The grip mechanism 18 has a rotatable grip roller 18a. The D-cassette 2 is held in the second cassette storage section 14 by fitting the grip roller 18a into the side recession 2c of the D-cassette 2.

Figure 5:
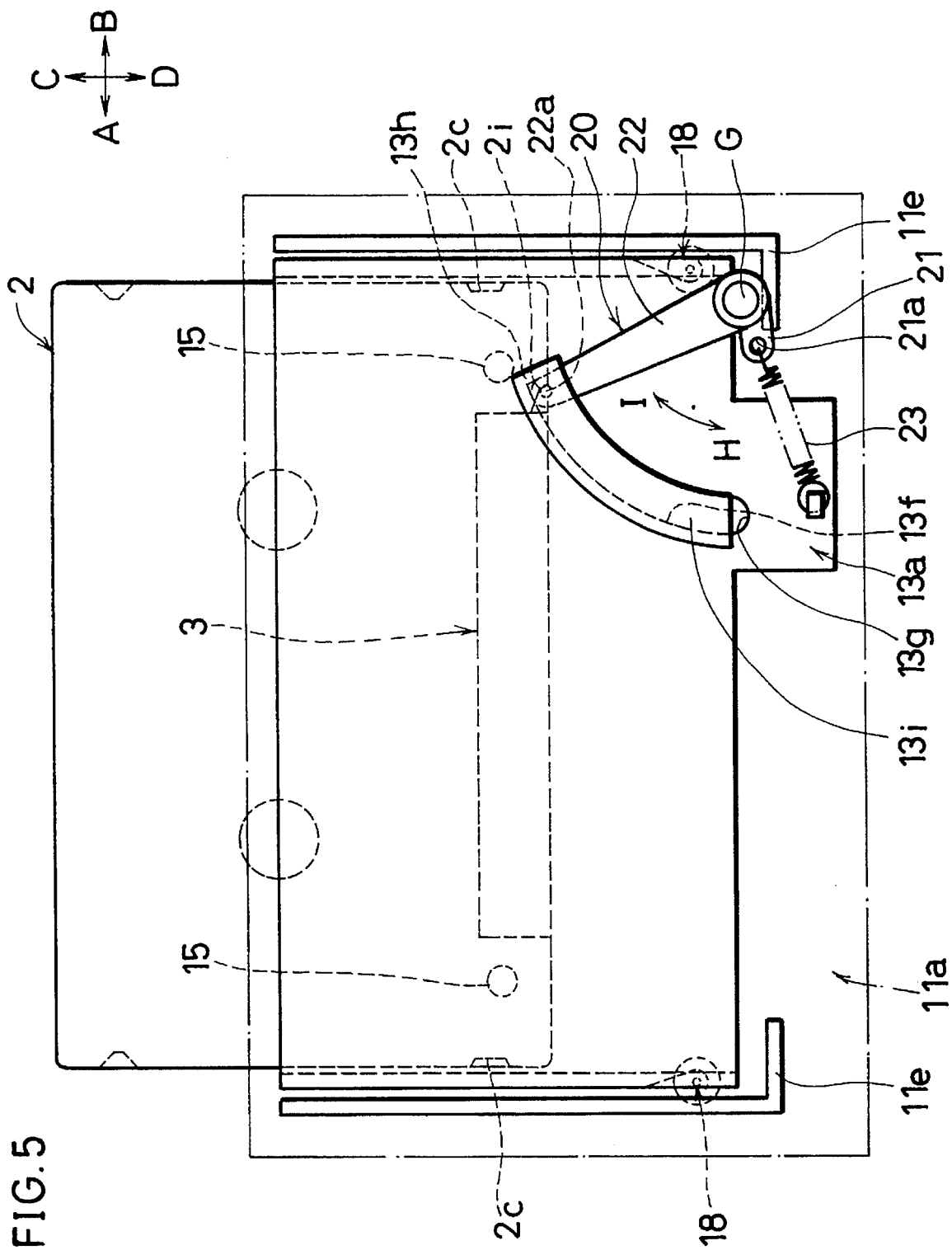

As illustrated in FIG. 5, mounted on the cover 13a is a slider moving lever 20 which is fixed at one end on the supporting point G and is movable in the H-I direction. The slider moving lever 20 has a short arm 21 and a long arm 22. An installation hole 21a is formed in the free end of the short arm 21. One end of a spring 23 is connected to the installation hole 21a, while the other end is connected to the cover 13a. With this arrangement, the slider moving lever 20 is always pushed in the I direction.

A pin 22a (slider contact member) is mounted perpendicularly to the underside of the free end of the long arm 22.

A slot 13f in the shape of an arc is formed in a portion of the cover 13a corresponding to an orbit of the pin 22a when the long arm is moved. The pin 22a is inserted into the slot 13f and designed to fit into the guide recession 2k of the D-cassette 2 when the D-cassette 2 is stored in the second cassette storage section 14.

The rear end of the slot 13f has an installation hole section 13g from which the pin 22a is inserted into the slot 13f. Meanwhile, the front end of the slot 13f has a positioning section 13h which restricts the movement of the pin 22a in the I direction caused by the spring 23 and places the pin 22a in a position corresponding to the guide recession 2k of the D-cassette 2. A stopper part 13i for preventing the pin 22a from coming out of the slot 13f is arranged along the outer edge of the slot 13f except the installation hole section 13g to cover the edge of the long arm 22. The stopper part 13i also restricts the position of the pin 22a in the E-F direction. The preciseness of the dimensions of the pin 22a is strictly controlled to prevent the edge of the pin 22a from hitting the underside of the guide recession 2k when it is inserted therein.

To avoid the C-cassette 1 (or the D-cassette 2) from being mistakenly inserted into the second cassette storage section 14 (or the first cassette storage section 12), the cassette storage sections 12 and 14 have D-cassette rejecting means (second cassette rejecting means) and the C-cassette rejecting means (first cassette rejecting means), respectively.

As illustrated in FIG. 1, the D-cassette rejecting means is constituted by the flat springs 19 (resilient members) mounted on the protruding parts 11c by high frequency welding. The edges of the flat springs 19 are curved so that they come into contact with the C-cassette 1. The distance between the contact section 19a of the flat spring 19 which comes into contact with the C-cassette 1 and the protruding part 11d is greater than the thickness (8.6 mm) of the C-cassette 1 but is smaller than the thickness (9.6 mm) of the D-cassette 2. The flat springs 19 are resiliently deformed only in the moving direction (E-F direction) of the cassette holder 10. With this arrangement, it is possible to insert the C-cassette 1 into the first cassette storage sectionl 12, but the flat springs 19 prevent the insertion of the D-cassette 2 into the first cassette storage section 12.

A spring restricting member 13j (deformation restricting member) extending from each of the protruding parts 13c is located over each spring 19. The spring restricting member 13j is formed substantially in an "S" shape in profile. The edge of the spring restricting member 13j is located in the vicinity of the flat spring 19 to prevent the plastic deformation of the flat spring 19 when the D-cassette 2 is mistakenly inserted into the first cassette storage section 12.

To prevent the mistakenly inserted D-cassette 2 from being damaged, it is desirable to place a molded cover made of, for example, a resin over the contact section 19a. In the case when the molded cover is placed over the contact surface 19a of the flat spring 19, the distance between the molded cover and the protruding part 11d should be equal to the distance between the contact section 19a and the protruding part 11d.

As for the prevention of the mistaken insertion of the D-cassette 2, by making the distance between the protruding part 11c and the protruding part 11d, i.e., the thickness of the first cassette storage section 12 greater than the thickness (8.6 mm) of the C-cassette 1 but smaller than the thickness (9.6 mm) of the D-cassette 2, such a mistaken insertion is prevented without using the flat springs 19 and spring restricting members 13j. In this case, however, the preciseness of the dimensions of the respective members are needed to be controlled more strictly compared to the case where the flat springs 19 are used. The reason for this is that when the cassette holder 10 is moved in the F direction, the C-cassette 1 is supported by the supporting bosses 8b and 8c and moved within the first cassette storage section 12 and the movement of the C-cassette 1 within the first cassette storage section 12 is more restricted compared to the case where the flat springs 19 are used. It is therefore particularly important to consider the over-stroke of the cassette holder 10.

On the other hand, to prevent the mistaken insertion of the C-cassette 1, the distance between the side walls 13b of the second cassette holder member 13 is arranged greater than the width (100.4 mm) of the main body of the C-cassette 1 but smaller than the overall width (the distance between the projections 1j). Restricting projections 13k (thickness restricting member) for restricting the thickness of the cassette tape to be stored in the second cassette storage section 14 are formed on the underside of the cover 13a of the second cassette holder member 13. In short, the C-cassette rejecting means is constituted by the side walls 13b placed at the above-mentioned interval and the restricting projections 13k. With this arrangement, it is possible to insert the D-cassette 2 into the second cassette storage section 14, but the C-cassette rejecting means prevents the insertion of the C-cassette 1 into the second cassette storage section 14. Namely, when the C-cassette 1 is tried to be inserted into the second cassette storage section 14, the side walls 13b and the restricting projections 13k interfere with the insertion of the C-cassette because of the side projections 1j and the raised portions 1f of the C-cassette 1.

Figure 6:
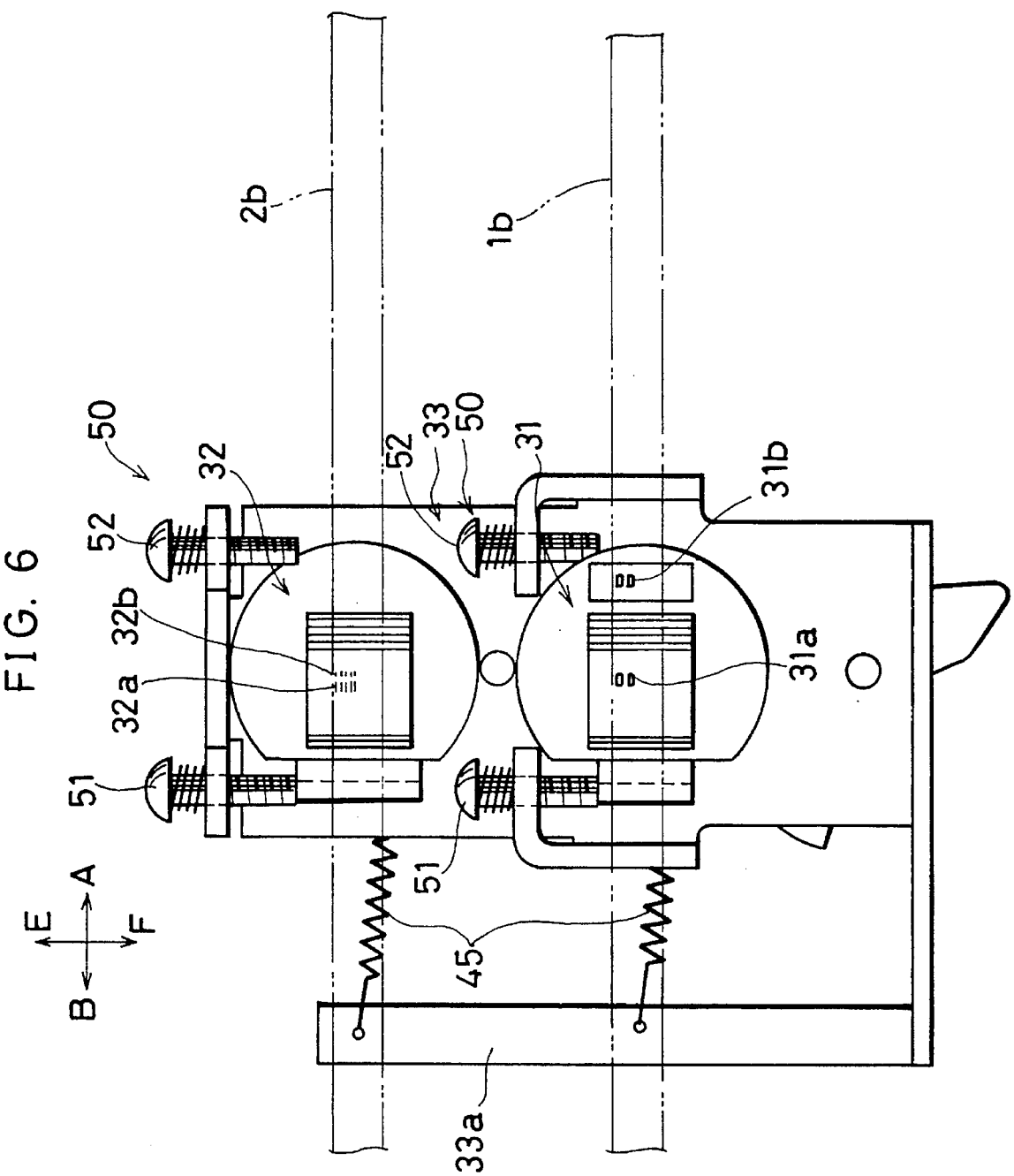

Next, the following description explains the head mechanism which records and reproduces information on the cassettes 1 and 2. As illustrated in FIG. 6, the head mechanism is constituted by a head 31 for analog signals and a head 32 for digital signals. The heads 32 and 31 are placed one upon another and supported by a head supporting body 33 so as to correspond to the magnetic tapes 2b and 1b of the cassettes 2 and 1 which are stored one upon another in the cassette holder 10. The head supporting body 33 is mounted on the main chassis 4 to be movable in the C-D direction. It is therefore possible to cause the heads 31 and 32 to slide along and come out of contact with the magnetic tapes 1 and 2.

Figure 7:
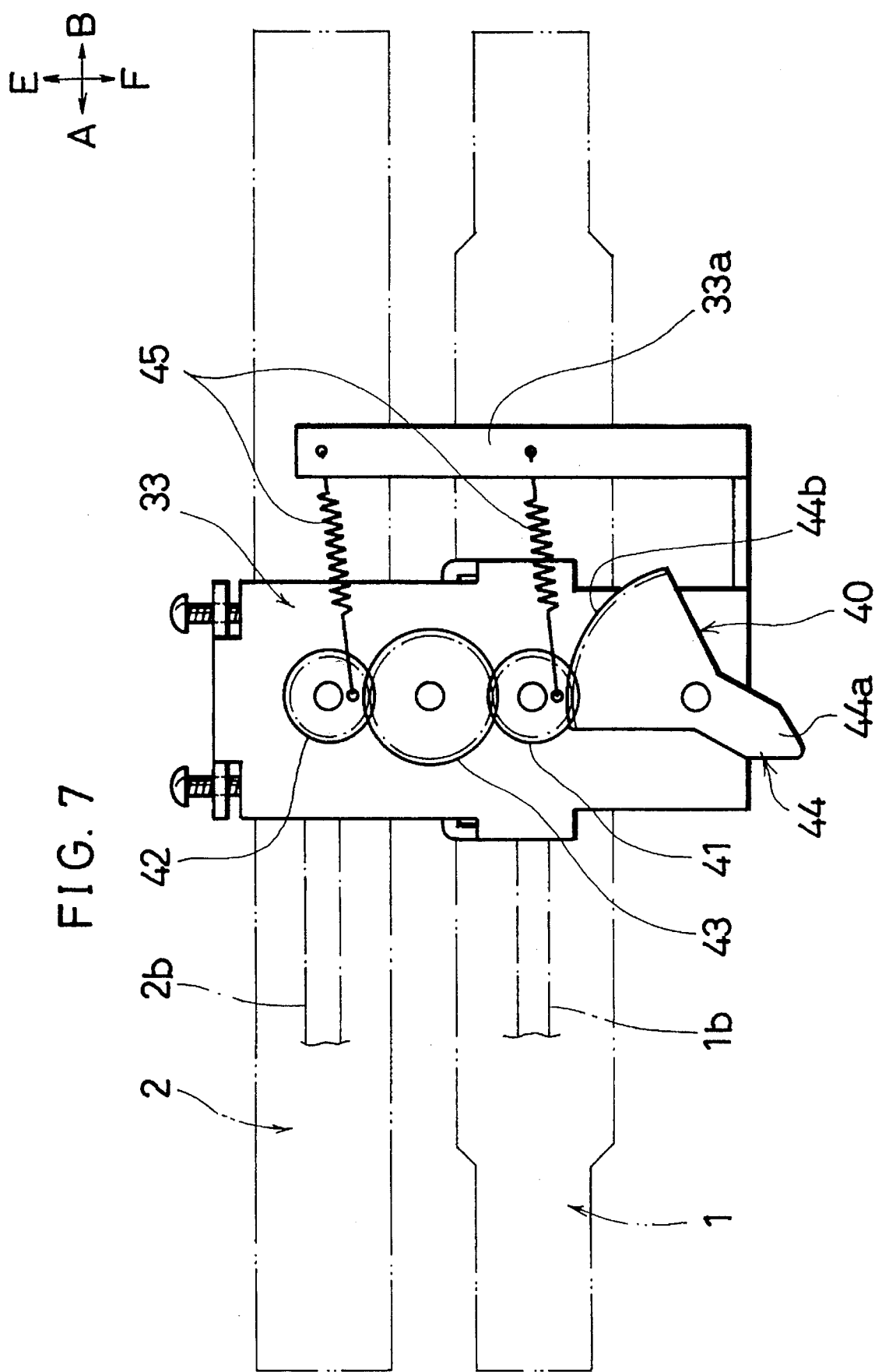
Figure 8:
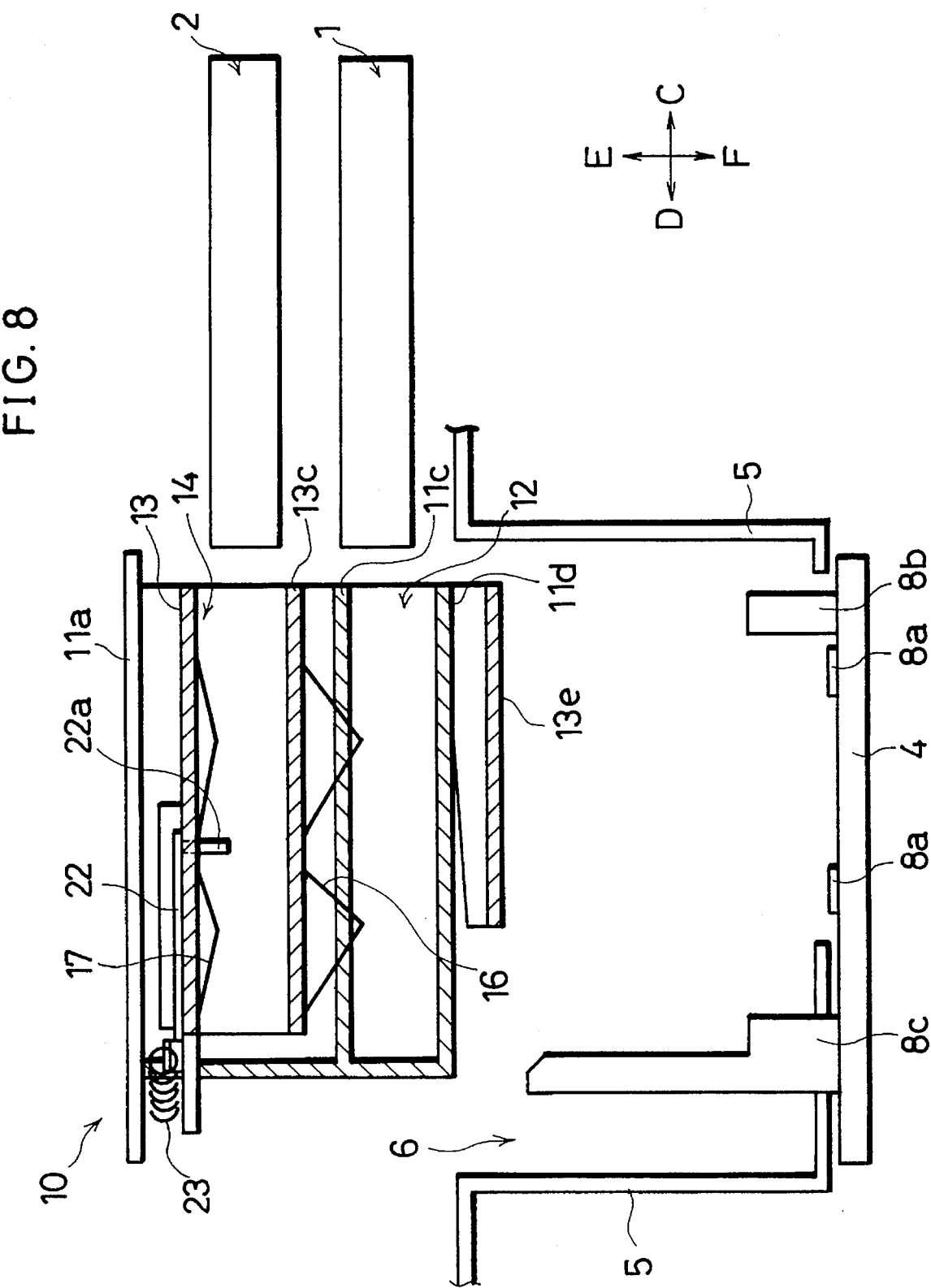

The head 31 includes a read-write head 31a and an erase head 31b, placed side by side. The head 32 includes a head whereupon a read head section 31a and a write head section 32b are placed side by side. A rotating shaft, not shown, is mounted integrally to the back of the head 31 and of the head 32. As illustrated in FIG. 7, a head rotating means 40 for driving the rotating shaft is mounted on the back of the head supporting body 33. When the rotating shaft mounted on the heads 31 and 32 are rotated by the head rotating means 40, recording and reproducing operations are performed with respect to both upper and lower tracks in forward and reverse sectors.

The head rotating means 40 has gears 41 and 42, an interlocking gear 43, and a switching lever 44 having a lever section 44a and a gear section 44b. The gears 41 and 42 have the same diameter and mounted at an end of the rotating shaft of the heads 31 and 32, respectively. The interlocking gear 43 is attached rotatably to the head supporting body 33 so as to mesh with the gears 41 and 42. The switching lever 44 is attached rotatably to the head supporting body 33 so that the gear section 44b meshes with the gear 41. The head supporting body 33 has an installation section 33a to which one end of each of two springs 45 is connected respectively.

The other end of each of the springs 45 is connected to the gears 41 and 42, respectively. The springs 45 give resistant power against the rotating direction of the gears 41 and 42. Accordingly, when the user moves the lever section 44a, the head rotating means 40 rotates the gears 41 and 42 in the same direction by the same angle through the interlocking gear 43.

As illustrated in FIG. 6, the head supporting body 33 has two azimuth angle adjusting means 50, 52 for adjusting the azimuth angle of the heads 31 and 32, respectively. Each azimuth angle adjusting means 50 has a pair of right azimuth pins 52 and left azimuth pins 51 and adjusts the azimuth angle of the head 31 or 32 by moving the azimuth pins 51 and 52 vertically, i.e., in the E-F direction and moving the heads 31 and 32 slightly.

The following description explains the operation of the cassette tape recorder with the above-mentioned configuration.

When recording or reproducing information on/from the C-cassette 1 or the D-cassette 2 with this cassette tape recorder, the user first presses the eject button. When the eject button is pressed, the projection 11f of the cassette holder 10 and the lock lever 5a in the holder storage section 6 are disconnected. This causes the cassette holder 10 stored in the holder storage section 6 to be moved in the load/unload position shown in FIG. 8.

Next, the user inserts the C-cassette 1 into the first cassette storage section 12 and the D-cassette 2 into the second cassette storage section 14 of the cassette holder 10 in the load/unload position. At this time, since the cassette storage sections 12 and 14 have the C-cassette rejecting means and the D-cassette rejecting means, it is possible to prevent the mistaken insertion of the C-cassette 1 (or D-cassette 2) into the second cassette storage section 14 (or first cassette storage section 12).

Figure 9:
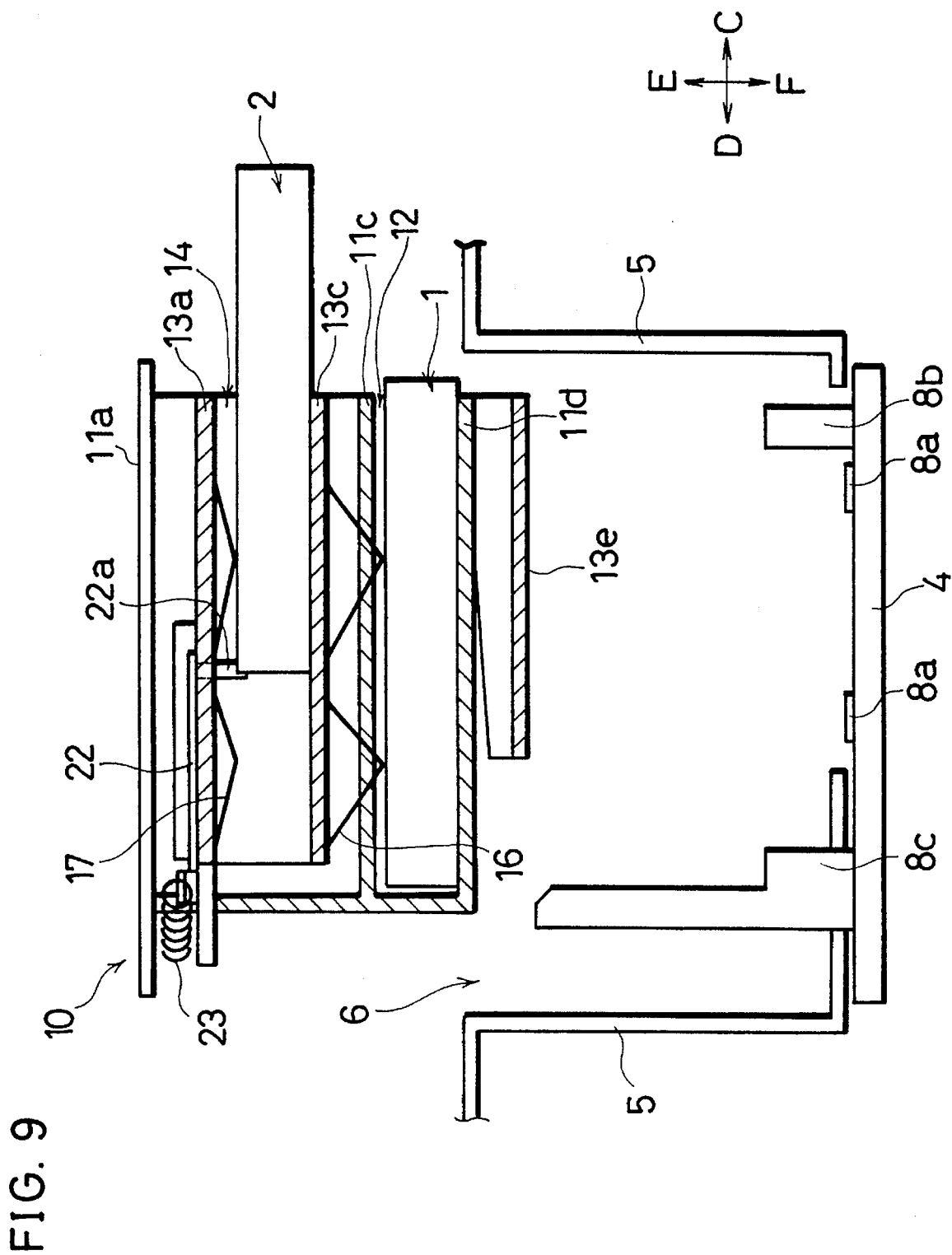

As illustrated in FIG. 9, when the C-cassette 1 is stored in the first cassette storage section 12, the upper side thereof is pushed in the F direction by the springs 16 and the lower side comes into contact with the protruding parts 11d of the main body 11.

Figure 10:
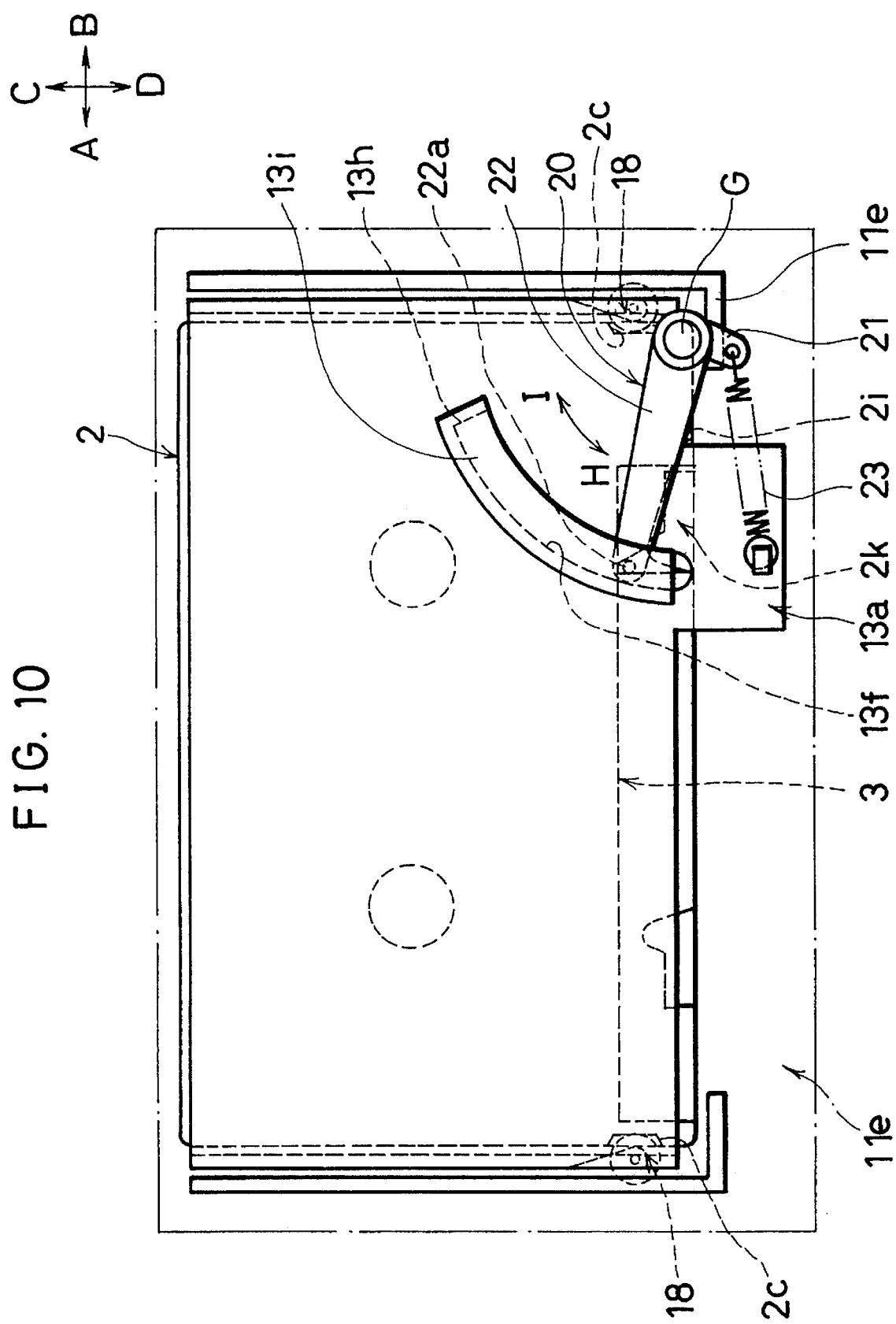

On the other hand, when the D-cassette 2 is stored in the second cassette storage section 14, the upper side thereof is pushed in the F direction by the springs 17 and the bottom side comes into contact with the protruding parts 13c of the second cassette holder member 13. In the process of storing the D-cassette 2 in the second cassette storage section 14, the pin 22a of the slider moving lever 20 is inserted into the guide recession 2k as shown in FIG. 5. Then, when the D-cassette 2 is pushed in the D direction, the pin 22a is moved in the H direction against the force of the spring 23. With the movement of the pin 22a, the slider 3 of the D-cassette 2 which is in contact with the pin 22a is moved in an opening direction (or the A direction). Finally, the grip roller 18a of the grip mechanism 18 fits into each of the side recessions 2c of the D-cassette 2. At this time the D-cassette 2 with the opening 2f exposed is held in the second cassette storage section 14 as shown in FIG. 10.

Next, the user pushes the cassette holder 10 storing the cassettes 1 and 2 in the cassette storage sections 12 and 14 in the F direction to move the cassette holder 10 from the load/unload position into the holder storage section 6. In this case, the cassette holder 10 is over-stroked to the stopper position and then moved back in the E direction by the pushing means of the holder moving mechanism so that the projection 11f and the lock lever 5a are locked together. As a result, the cassette holder 10 is held in the predetermined record/reproduction position in the holder storage section 6.

When the cassette holder 10 is held in the record/reproduction position, the second cassette holder member 13 is pushed in the F direction by the spring 15 and the contact section 13e is supported by the supporting bosses 8a and 8c on the main chassis 4. Thus, the second cassette holder member 13 is fixed on a predetermined level in the holder storage section 6. And, the D-cassette 2 which is fixed in position in the second cassette storage section 14 by the springs 17 is fixed in the predetermined record/reproduction position in the holder storage section 6.

On the other hand, the underside of the C-cassette 1 in the first cassette storage section 12 is supported by the supporting bosses 8b and 8c and lifted in the E direction against the force of the springs 16 exerted in the F direction so as to fix the C-cassette 1 in the predetermined record/reproduction position in the holder storage section 6. When the cassette holder 10 is fixed in the record/reproduction position, since the C-cassette 1 is supported by the supporting bosses 8b and 8c, the position thereof is displaced in the E direction in the first cassette storage section 12. When the C-cassette 1 is displaced significantly in the first cassette storage section 12, it may come into contact with the flat spring 19. However, since the flat springs 19 are bent in the E direction, there is no problem in storing the C-cassette 1 in the first cassette storage section 12.

After fixing the cassettes 1 and 2 in the record/reproduction position in the holder storage section 6, the head supporting body 33 is moved in the C direction over the main chassis 4 so as to cause the heads 31 and 32 to slide along the magnetic tape 1b and 2b of the cassettes 1 and 2, respectively. Then, in accordance with the recording or reproducing operation with respect to the cassettes 1 or 2, the reel shafts 7 rotate to wind the magnetic tapes 1b or 2b to effect the desired operation.

In the above-mentioned description, both of the C-cassette 1 and the D-cassette 2 are stored in the cassette holder 10. However, the above-mentioned operation of the cassette tape recorder is executable even when only one of these cassettes is stored in the cassette holder 10.

As described above, the cassette holder 10 of the present cassette tape recorder includes the second cassette storage section 14, and the second cassette holder member 13 having the slider moving lever 20. The slider moving lever 20 is supported by the main body 11 having the first cassette storage section 12 so that the second cassette holder member 13 is slightly movable. The positioning of the D-cassette 2 in the holder storage section 6 is executed by positioning the second cassette holder member 13 in the cassette holder section 6. The positional relation between the D-cassette 2 and the second cassette holder member 13 in the load/unload position and in the record/reproduction position is maintained to be unchanged. This arrangement enables the cassette holder 10 to store both the C-cassette 1 and the D-cassette 2 at the same time.

The cassette holder 10 also includes the slider moving lever 20 which automatically opens the slider 3 when the D-cassette 2 is inserted into the second cassette storage section 14, and D-cassette rejecting means and the C-cassette rejecting means which prevent a cassette other than a specified cassette from being mistakenly inserted into the cassette storage sections 12 and 14. Thus, the cassette tape recorder having the cassette holder 10 which is compatible with both the C-cassette and the D-cassette achieves easier loading of the C-cassette and the D-cassette.

In this embodiment, the head 31 for analog signals and the head 32 for digital signals are rotary heads rotated by the head rotating means 40. However, this is merely an example, and therefore the heads 31 and 32 are not necessarily rotary heads. For instance, it is possible to make both the heads 31 and 32 fixed heads corresponding to full tracks or to make them a combination of a fixed head and a rotary head. In any case, by proving the heads 31 and 32 exclusively for the cassettes 1 and 2, respectively, it is possible to prevent the gaps in the head 32 from being clogged with the magnetic powder on the magnetic tape 1*b* of the C-cassette 1.

As described above, the cassette tape player of the present invention is capable of performing at least a recording or reproducing operation and compatible with cassette tapes of different formats. Namely, the first cassette tape having an exposed head insertion opening in its front edge; and the second cassette tape has a head insertion opening in its front edge, a slider which is attached onto the front edge for covering the opening and movable in a longitudinal direction, and a guide recession formed at a portion of the front edge where the slider is attached. The cassette tape player includes:

a main body having a cassette holding means storage section for storing cassette holding means;

the cassette holding means which is movable in directions in which it is moved to be stored in the cassette holding means storage section and moved out thereof, which holds the first cassette tape and the second cassette tape in a state where they are placed one upon another, and which includes a cassette holder main body having a first cassette storage section for storing the first cassette tape and a second cassette storage section for storing the second cassette tape, and a second cassette holder member which is supported by the cassette holder so that it is slightly movable in a direction in which the cassette holding means is moved;

first cassette fixing means for fixing the first cassette tape in the first cassette storage section;

second cassette fixing means for fixing the second cassette tape in the second cassette storage section;

holder fixing means for fixing the second cassette holder member in the cassette holding means storage section;

slider moving means which is mounted on the second cassette holder member and inserted into the guide recession to move the slider in an opening direction by pushing;

first cassette positioning means which comes into contact with the first cassette tape stored in the first cassette storage section and moves the first cassette tape in the moving direction of the cassette holding means to place it in a predetermined position; and holder positioning means which comes into contact with the second cassette holder member and moves the second cassette holder member in the moving direction of the cassette holding means to place it in a predetermined position.

With this configuration, the second cassette tape is not displaced from a predetermined position into the moving direction of the cassette holding means within the second cassette storage section. More specifically, in states where the cassette holding means is stored in the cassette holding means storage section (i.e., when the cassette holding means is in the record/reproduction position) and where the cassette holding means is taken out of the cassette holding means storage section (i.e., when the cassette holding means is in the load/unload position), the positional relation between the second cassette tape and the second cassette holder member is unchanged. Consequently, the positional relation between the slider moving means of the second cassette holder member and the second cassette tape is maintained to be unchanged. Therefore, the slider moving means is easily installed in the second cassette holder member, and the slider moving means installed in the second cassette holder member always opens the slider of the second cassette tape properly.

Namely, the above-mentioned cassette tape player compatible with cassette tapes of different formats is capable of holding the first and second cassette tapes in a state they are placed one upon another and has the cassette holding means with the slider moving means which properly opens the slider of the second cassette tape. Thus, differently from a cassette tape recorder having a cassette holder which stores cassettes of different formats in the same cassette storage section, there is no need to incorporate into the cassette tape player of the present invention an extra device, such as cassette detecting means. It is thus possible to achieve a great reduction in the costs. Moreover, with the present invention, since it is possible to install separate magnetic heads for analog signals and digital signals, the analog cassette tape does not have to be fed past the head for digital signals. This arrangement enables the life of the magnetic heads to be significantly lengthened and the quality of the recording and reproduction to be improved.

Furthermore, the cassette tape player of the present invention includes first cassette rejecting means for preventing the first cassette tape from being mistakenly inserted into the second cassette storage section, and second cassette rejecting means for preventing the second cassette tape from being mistakenly inserted into the first cassette storage section.

These means prevent a cassette with a format other than a specified format from being mistakenly inserted into the cassette storage section without using any extra device, such as cassette detecting means. This arrangement prevents the malfunction of the cassette tape player or the cassette tapes as a result of the mistaken insertion of the cassette tape of different formats into the cassette storage section.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cassette tape player which is compatible with cassette tapes of different formats and at least capable of recording and reproducing information on a first cassette tape and a second cassette tape, the first cassette being an analog cassette and the second being a digital cassette, wherein a reel hole recession is formed completely through said first tape and a reel hole recession is formed partially through said second cassette tape, said second cassette tape has an opening for a head, which is covered by a slider so that can freely open and close, and a guide recession formed at a portion where said slider is attached, said cassette tape player comprising:

a main body having a cassette holding means storage section for storing cassette holding means;

a reel shaft mounted on the main body frame so as to extend in the cassette movement direction, said reel shaft being inserted into the reel hole recession of said first cassette tape completely through said first cassette tape and into the reel hole recession of said second cassette tape which is only partially through said second cassette tape;

said reel shaft having a first reel hub attached at an upper end portion for engaging said second cassette tape and a second reel hub rotatably attached to a central portion for engaging said first cassette tape, and wherein said first reel hub and said second reel hub are individually rotatable;

said cassette holding means which is capable of reciprocating in the cassette moving direction between a cassette loading position and an operating position and holds said first cassette tape and said second cassette tape in a state where they are placed one upon another, and which includes a cassette holder main body having a first cassette storage section for storing said first cassette tape, a second cassette storage section for storing said second cassette tape and a second cassette holder member which is supported by said cassette holder main body;

first cassette fixing means for fixing said first cassette tape in a predetermined position in said first cassette storage section;

second cassette fixing means for fixing said second cassette tape within said second cassette holder member in said second storage section in such a position that, irrespectively of whether said cassette holder is in the cassette loading position or the operating position, in a state where the second cassette tape is stored in the second cassette storing section, the position of the second cassette tape within said second storing section and relative to a slider mover means mounted on said second cassette holder member is maintained constant;

holder fixing means for fixing said second cassette holder member in a predetermined position in said cassette holding means storage section;

said slider moving means mounted on said second cassette holder member includes a slider contact member which is inserted into said guide recession to move said slider in an operating direction by pushing;

first cassette positioning means which comes into contact with said first cassette tape stored in said first cassette storage section and moves said first cassette tape in the moving direction of said cassette holding means to place it in a predetermined position in said cassette holding means storage section; and holder positioning means which comes into contact with said second cassette holder member and moves said second cassette holder member in the moving direction of the cassette holding means to place it in a predetermined position in said cassette holding means storage section, wherein said first cassette storing section is positioned closer to the main body than said second cassette storing section so that when said cassette holding means is moved to the operating position, said reel shaft is inserted into the reel hole recession of said first cassette tape and said second cassette tape.

2. The cassette tape player compatible with cassette tapes of different formats according to claim 1, wherein said cassette holder main body comprises:

a covering member for covering said cassette holding means storage section;

side wall members mounted perpendicularly to said covering member near both ends thereof; and a first cassette storage section forming member mounted on said side wall members for forming said first cassette storage section.

3. The cassette tape player compatible with cassette tapes of different formats according to claim 2, wherein said second cassette holder member is covered with said covering member and said side wall members.

4. The cassette tape player compatible with cassette tapes of different formats according to claim 3, wherein said second cassette holder member includes:

a first plate member placed to face said covering member;

side wall members which are mounted perpendicularly to said first plate member near both ends thereof to face said side wall members of said cassette holder main body and have a contact section which comes into contact with said holder positioning means in said cassette holding means storage section; and a second cassette storage section forming member mounted to said side wall members to form said second cassette storage section together with said first plate member.

5. The cassette tape player compatible with cassette tapes of different formats according to claim 4, wherein the side wall members of said cassette holder main body have guide slots extending in the moving direction of said cassette holding means, and the side wall members of said second cassette holder member have protruding parts to be inserted into said guide slots, and wherein said second cassette holder member is moved while being guided by said guide slots and changes its position with respect to said cassette holder main body.

6. The cassette tape player compatible with cassette tapes of different formats according to claim 4, wherein a distance between said side wall members of said second cassette holder member is greater than an overall width of said second cassette tape and smaller than an overall width of said first cassette tape so as to prevent said first cassette tape from being inserted into said second cassette storage section.

7. The cassette tape player compatible with cassette tapes of different formats according to claim 3, wherein said holder fixing means includes holder pushing means for pushing said second cassette holder member toward the main body of said player.

8. The cassette tape player compatible with cassette tapes of different formats according to claim 7, wherein said holder pushing means is a spring attached between said cassette holder main body and said second cassette holder member.

9. The cassette tape player compatible with cassette tapes of different formats according to claim 1, wherein said first cassette fixing means includes first cassette pushing means for pushing said first cassette stored in said first cassette storage section toward the main body of said player along a moving direction of said cassette holder main body.

10. The cassette tape player compatible with cassette tapes of different formats according to claim 9, wherein said first cassette pushing means is a flat spring.

11. The cassette tape player compatible with cassette tapes of different formats according to claim 1, wherein said second cassette fixing means includes second cassette pushing means for pushing said second cassette stored in said second cassette storage section toward the main body of said player.

12. The cassette tape player compatible with cassette tapes of different formats according to claim 11, wherein said second cassette pushing means is a flat spring.

13. The cassette tape player compatible with cassette tapes of different formats according to claim 1, wherein said slider moving means includes a slider moving member which is inserted into said guide recession of said second cassette tape, pivots with a movement of said second cassette tape in a storing direction, and opens said slider by pushing when said second cassette tape is stored in said second cassette storage section.

14. The cassette tape player compatible with cassette tapes of different formats according to claim 13, wherein said slider moving means includes a slider moving lever attached pivotally to said second cassette holder member, and a contact member which is mounted on a free end of said slider moving lever, inserted into said guide section of said second cassette tape, and comes into contact with said slider.

15. The cassette tape player compatible with cassette tapes of different formats according to claim 1, further comprising first cassette rejecting means for preventing said first cassette tape from being mistakenly inserted into said second cassette storage section.

16. The cassette tape player compatible with cassette tapes of different formats according to claim 15, wherein said first cassette rejecting means includes a restricting member, installed in said second cassette storage section, for restricting a thickness of a cassette tape to be stored in said second cassette storage section, and wherein said restricting means prevents said first cassette tape with an overall thickness greater than that of said second cassette tape from being inserted into said second cassette storage section.

17. The cassette tape player compatible with cassette tapes of different formats according to claim 1, further comprising second cassette rejecting means for preventing said second cassette tape from being mistakenly inserted into said first cassette storage section.

18. The cassette tape player compatible with cassette tapes of different formats according to claim 17, wherein said second cassette rejecting means includes a resilient member which is installed in said first cassette storage section, and is resiliently deformed in the moving direction of said cassette holding means but not in a storing direction of said cassette tape, and wherein said resilient member prevents said second cassette tape whose thickness is greater than that of a main body of said first cassette tape from being inserted into said first cassette storage section.

19. The cassette tape player compatible with cassette tapes of different formats according to claim 18, wherein said resilient member is a flat spring.

20. The cassette tape player compatible with cassette tapes of different formats according to claim 18, further comprising deformation restricting means for restricting a deformation of said resilient member in a direction in which said cassette holding means is taken out of the main body of said player.

21. The cassette tape player compatible with cassette tapes of different formats according to claim 1, wherein said first cassette positioning means includes a first cassette movement restricting member for restricting a movement of said first cassette tape stored in said first cassette storage section toward the main body of said player.

22. The cassette tape player compatible with cassette tapes of different formats according to claim 21, wherein said first cassette movement restricting member is a supporting boss which is mounted on the main body of said player and supports said first cassette tape stored in said first cassette storage section.

23. The cassette tape player compatible with cassette tapes of different formats according to claim 1, wherein said holder positioning means includes a holder movement restricting member for restricting a movement of said second cassette holder member toward the main body of said player.

24. The cassette tape player compatible with cassette tapes of different formats according to claim 23, wherein said holder movement restricting member is a supporting boss which is mounted on the main body of said player and supports said second cassette holder member.

25. A cassette tape player comprising:

a main body frame;

a primary cassette holder which reciprocates in a cassette movement direction with respect to the main body frame between a cassette loading position and an operating position, the primary cassette holder being housed within the main body frame when the cassette is in the operating position, the primary cassette holder defining a storage section for an analog cassette;

a secondary cassette holder carried by the primary cassette holder and capable of movement in the cassette movement direction relative to the primary cassette holder, the secondary cassette holder defining a storage section for a digital cassette wherein the digital cassette remains at a fixed position within the secondary cassette holder with respect to a slider mover mounted on said secondary cassette holder irrespective of whether the secondary cassette holder is in a cassette loading position or an operating position;

and wherein said slider mover mounted on said secondary cassette holder is responsive to insertion of the digital cassette into said secondary cassette holder for moving a slider provided on the digital cassette;

a holder biasing member for urging the secondary cassette holder to a predetermined position with respect to the main body frame when said primary cassette holder is in the operating position; and a cassette biasing member for positioning the digital cassette in said fixed position in said secondary cassette holder for engagement of the slider by the slider mover.

26. The cassette tape player of claim 25, wherein the holder biasing member for urging the secondary cassette holder to a predetermined position within the primary cassette holder comprises a spring attached to the primary cassette holder.

27. The cassette tape player of claim 25, further comprising:

means attached to the secondary cassette holder for positioning the analog cassette in a predetermined position in the storage section for the analog cassette.

28. The cassette tape player of claim 25, wherein the storage section defined by the secondary cassette holder for the digital cassette is a constant-volume storage section.

29. The cassette tape player of claim 25, further comprising:

two reel shafts mounted on the main body frame to extend perpendicularly therefrom in the cassette movement direction, the two reel shafts extending in the cassette movement direction completely through the storage section for the analog cassette and extending only partially through the storage section for the digital cassette.

\* \* \* \* \*